United States Patent
Anderson

(10) Patent No.: US 6,321,358 B1
(45) Date of Patent: Nov. 20, 2001

(54) OBJECT RECONSTRUCTION ON OBJECT ORIENTED DATA STORAGE DEVICE

(75) Inventor: David B. Anderson, Minnetonka, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/141,388

(22) Filed: Aug. 27, 1998

Related U.S. Application Data

(60) Provisional application No. 60/057,376, filed on Aug. 28, 1997.

(51) Int. Cl.[7] .................................................. G11C 29/00
(52) U.S. Cl. ............................................................ 714/763
(58) Field of Search .................................. 714/763, 769; 707/200, 205; 360/48; 369/275.4, 275.3

(56) References Cited

U.S. PATENT DOCUMENTS

| | | | |
|---|---|---|---|
| 4,953,080 | 8/1990 | Dysart et al. | 707/103 |
| 5,187,786 | 2/1993 | Densmore et al. | 707/3 |
| 5,226,168 | 7/1993 | Kobayashi et al. | 703/25 |
| 5,371,885 | 12/1994 | Letwin | 707/205 |
| 5,394,526 | 2/1995 | Crouse et al. | 709/219 |
| 5,463,774 | 10/1995 | Jenness | 707/10 |
| 5,504,892 | 4/1996 | Atsatt et al. | 707/103 |
| 5,548,724 | 8/1996 | Akizawa et al. | 709/203 |
| 5,550,976 | 8/1996 | Henderson et al. | 709/201 |
| 5,594,862 | 1/1997 | Winkler et al. | 714/5 |
| 5,615,363 | 3/1997 | Jenness | 707/103 |
| 5,617,425 | 4/1997 | Anderson | 714/710 |
| 5,640,286 | 6/1997 | Acosta et al. | 360/48 |
| 5,655,080 | 8/1997 | Dias et al. | 709/202 |
| 5,708,649 | * 1/1998 | Kamoto et al. | 369/275.3 |
| 5,724,581 | 3/1998 | Kozakura | 707/202 |
| 5,774,643 | 6/1998 | Lubbers et al. | 711/20 |
| 5,832,526 | * 11/1998 | Schuyler | 707/205 |
| 6,069,870 | * 5/2000 | Maeda et al. | 369/275.4 |

OTHER PUBLICATIONS

"Filesystems for Network–Attached Secure Disks", by Garth A. Gibson et al., Jul. 1997, School of Computer Science, Carnegie Mellon University, Pittsburgh, Pennsylvania.

"A Case for Redundant Arrays of Inexpensive Disks (RAID)", by David A. Patterson, Garth Gibson and Randy H. Katz, Dec. 1987, Computer Science Division, University of California.

* cited by examiner

*Primary Examiner*—Albert Decady
*Assistant Examiner*—Shelly A Chase
(74) *Attorney, Agent, or Firm*—Joseph R. Kelly; Westman, Champlin & Kelly, P.A.

(57) ABSTRACT

The present invention is drawn to a data storage device which includes data stored thereon as objects. An object has a plurality of portions including a data portion containing data and an object location portion containing object location information associated with the object. The present invention can be implemented simply as a data structure, in a disc drive, or as a method of storing information on a disc drive or other data storage device.

18 Claims, 23 Drawing Sheets

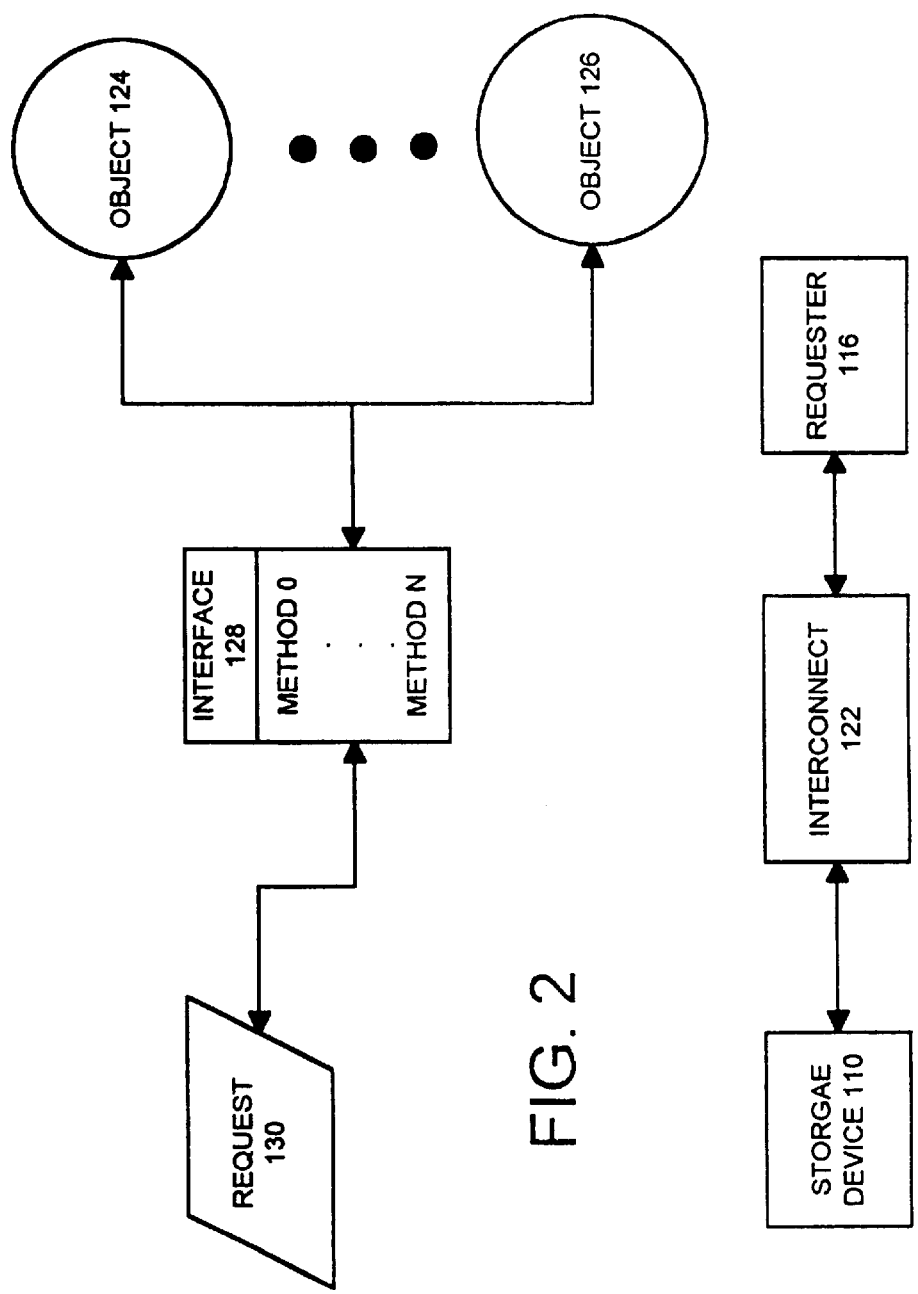

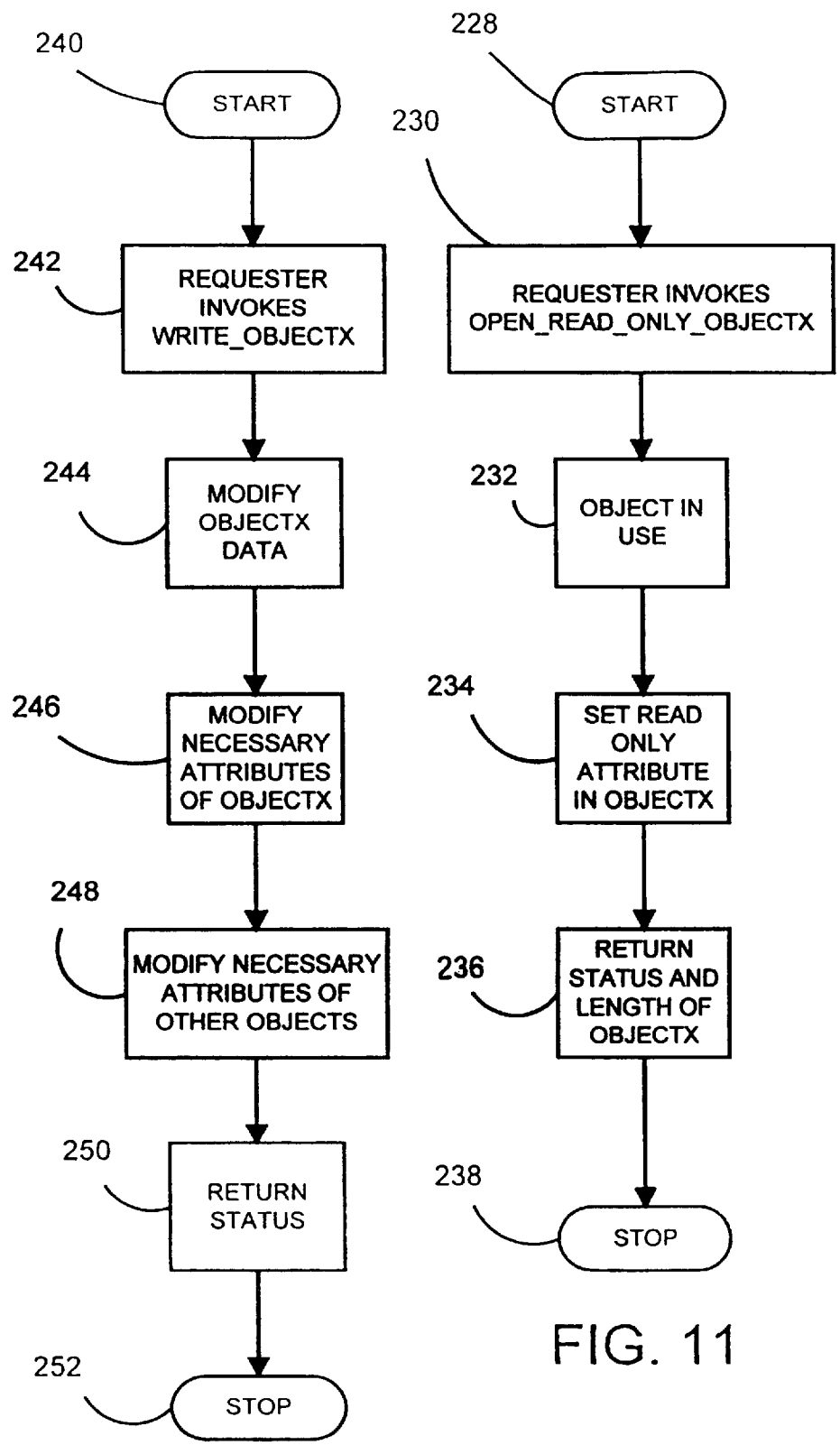

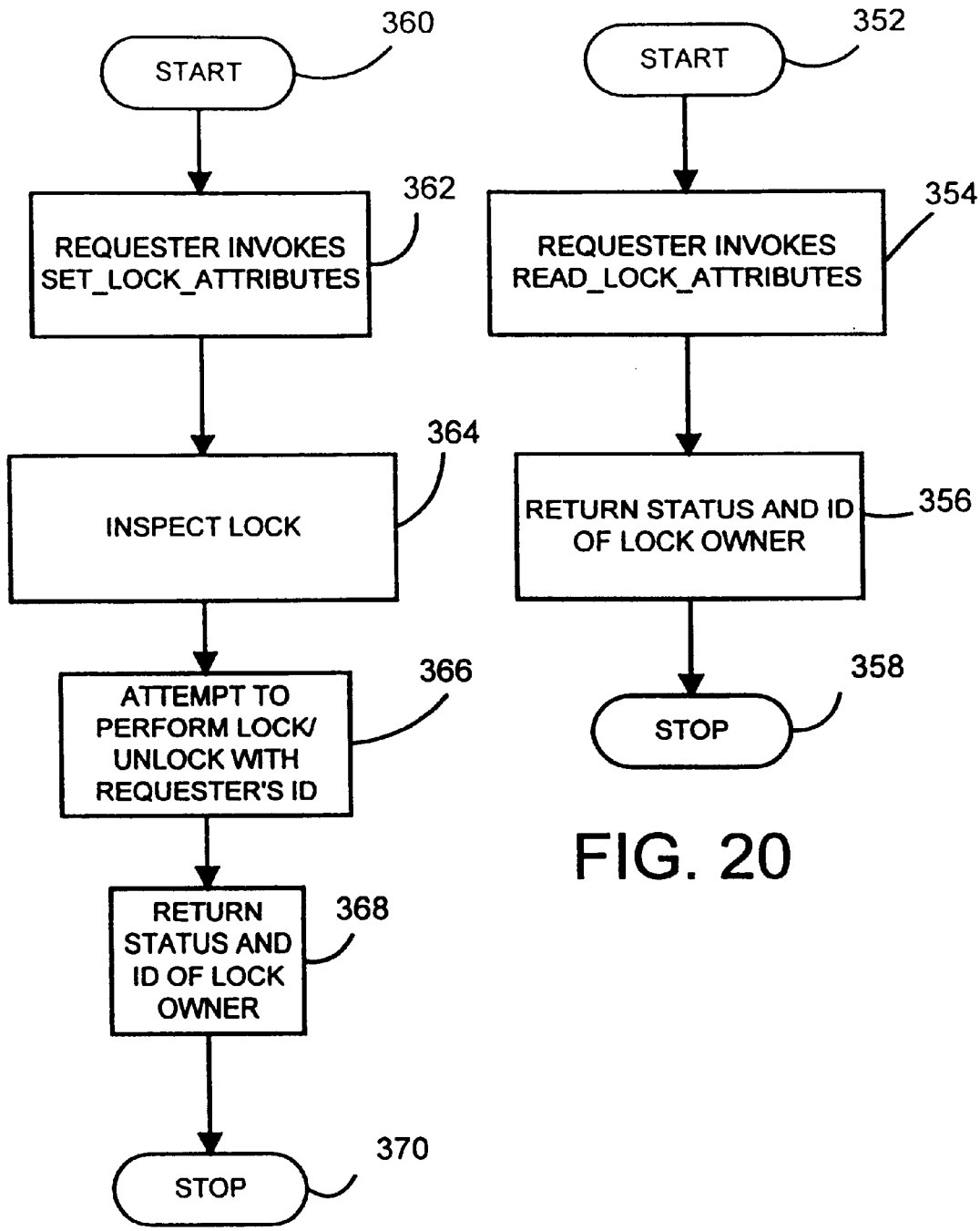

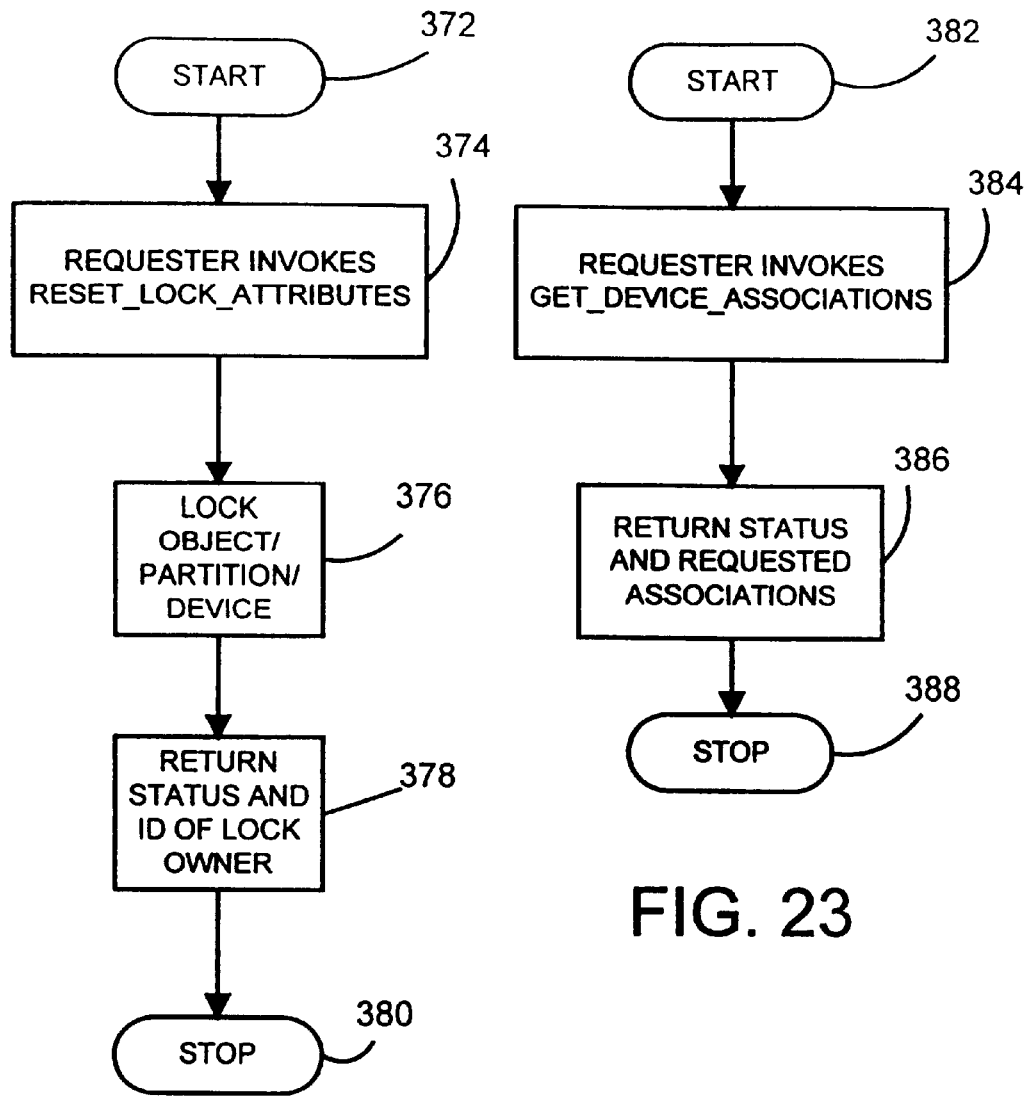

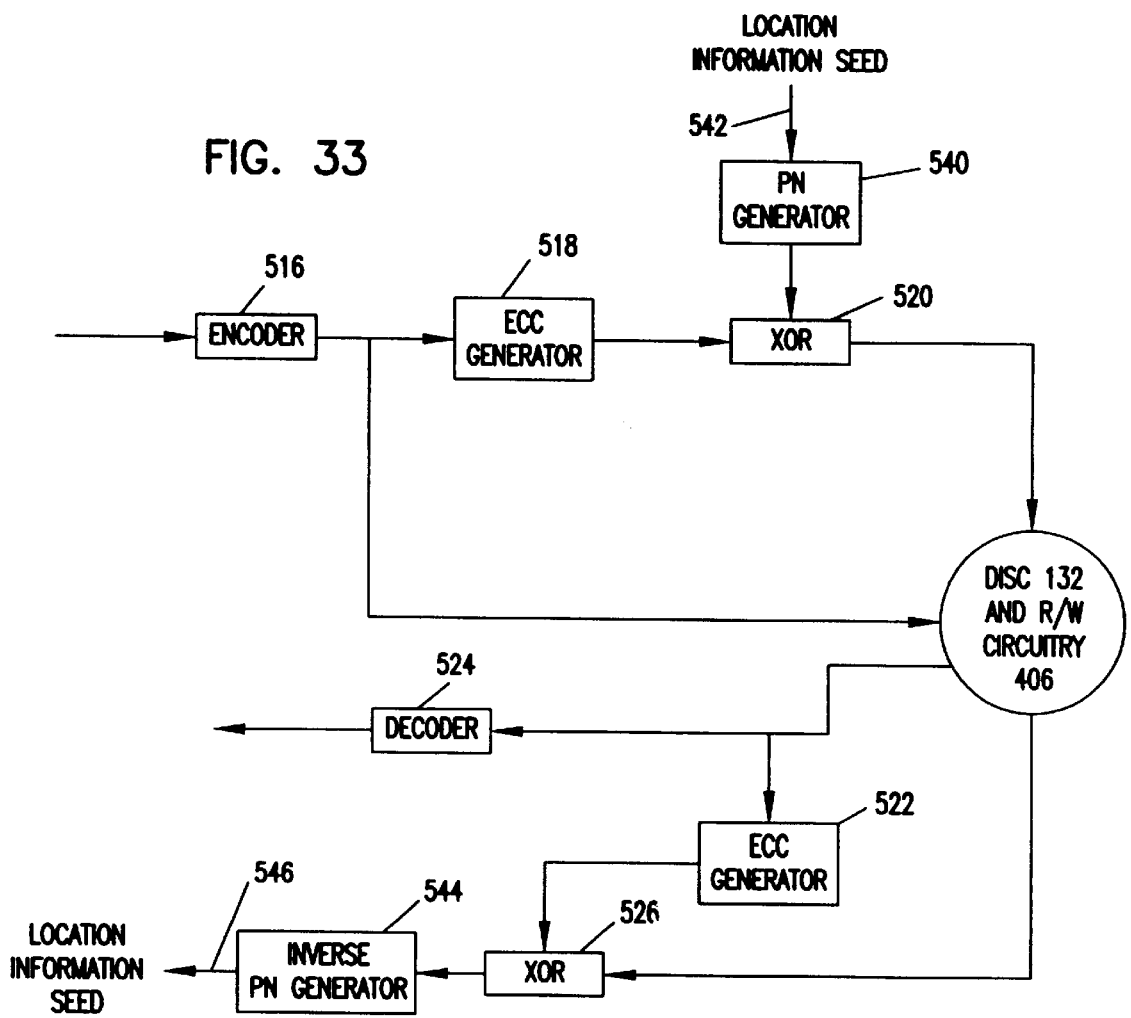

OBJECT RECONSTRUCTION ON OBJECT ORIENTED DATA STORAGE DEVICE

REFERENCE TO RELATED APPLICATION

The present application claims priority from U.S. provisional application Ser. No. 60/057,376 filed on Aug. 28, 1997.

FIELD OF THE INVENTION

The present invention relates to data storage devices. More specifically, the present invention relates to a data storage device, such as a disc drive, tape drive, or optical drive, in which data is organized and accessed as objects.

BACKGROUND OF THE INVENTION

Two conventional computer models have become well known in the industry of computing. The first is a mainframe computing model and the second is a clustered computing model.

The traditional progression for an end user in the mainframe computing model is to purchase an initial system, and when additional processing capabilities are required, to replace the initial system with a bigger system. At various points in this cycle, traumatic discontinuities occur. For example, if the user outgrows the architecture of the initial system, the user may need to convert from one operating system to another, or even from one vendor's proprietary architecture to that of another vendor, when the second upgraded mainframe system is purchased. These changes entail enormous costs for the organization purchasing the upgrade, in both dollars and employee time. Therefore, such conversions are avoided, in many cases.

In addition, the mainframe model entails poor residual value of computer equipment. Thus, the system replacement often results in invested capital which is substantially completely lost when the initial system is replaced by an upgraded system. Further, larger upgraded systems tend to be sold in lower volumes than smaller systems. Thus, each new system upgrade typically has a higher cost of computing than the previous system.

In a clustered computing model, a mainframe computer is replaced with a cluster of smaller, standards-based servers. This can offer many advantages over the mainframe model. Since the cluster may start off as only a single system, the threshold to entering the cluster model is lower. Further, such smaller systems are typically sold in high volume, making the cost of computing less. Also, such systems are standards based in that they do not exhibit dependence on proprietary architectures. This provides for the availability of equipment from multiple sources which allows the user to choose the best alternative with each subsequent purchase.

Still other advantages present themselves with the clustered computing model. Upgrade costs can be controlled more precisely by adding only the amount of additional resources required to meet existing and immediate future needs. Further, the user can choose from a wide variety of vendors, without concern about migration or conversion to a new architecture. Similarly, with the right architecture, there may never be a need for conversion to another operating system.

Still, the clustered computing model does have disadvantages and problems. For example, the clustered computing model encounters difficulty in providing clustered systems with the ability to share data in a way that allows the cluster to take on the workload that a single mainframe could perform. For example, it is currently very difficult to implement clustered models where each of the servers in the cluster are required to process transactions on the same data. Examples of some such applications include an airlines reservations system or a financial institution's complete inventory of transactions.

The second disadvantage of the clustered computing model simply involves the lack of extensive experience in managing storage and data which exists in the mainframe environment. Such experience has evolved into management software that is simply not yet available in the standards based cluster environment.

Conventional disc drives also include disadvantages which are related to the loss of operating system information. For example, a conventional disc drive contains millions of sectors of data. For any number of different reasons, one or more of the sectors may become unreadable or corrupted. If the sector which becomes unreadable is one that is used for a special purpose by the operating system, the entire disc space in the disc drive may be rendered unusable, even if the entire rest of the disc drive can be read. For example, in a personal computer environment, the master boot record, partition boot record, file attribute table (FAT) or the root directory can be become unreadable or corrupt. This can cause the loss of essentially the entire contents of the disc drive. No conventional operating system has the ability to recover all the readable data in the face of losing such key file system management data. This represents a tremendous loss for a user, and is especially unfortunate since the data that is lost is operating system related, and has little or nothing to do with the actual data stored on the disc drive, which cannot be read.

To date, any service for recovering data in such instances is typically very cumbersome. Such services generally require physically removing the disc drive from its operating environment and sending it to a company or service provider engaged in the service of recovering such data. This service is provided with no guarantee of success, and with no protection against the consequent breach of privacy which attends the relinquishing of the disc drive for this purpose.

The present invention addresses these and other problems, and offers other advantages over the prior art.

SUMMARY OF THE INVENTION

The present invention is drawn to a data storage device which includes data stored thereon as objects. An object has a plurality of portions including a data portion containing data and an object location portion containing object location information associated with the object.

BRIEF DESCRIPTION OF THE DRAWINGS

FIG. 2 illustrates an object model in accordance with one aspect of the present invention.

FIG. 3-1 is a block diagram of a first configuration in which an object on the storage device is accessed by a requester.

FIG. 3-2 is a block diagram of a second configuration in which an object on a storage device is accessed by a requester.

FIGS. 7-1 and 7-2 show a flow diagram illustrating access of an object by a requester in accordance with one aspect in accordance of the present invention.

FIG. 10 is a flow diagram which illustrates writing to an object in accordance with one aspect of the present invention.

FIG. 11 is a flow diagram which illustrates opening an object for read only purposes in accordance with one aspect of the present invention.

FIG. 20 is a flow diagram which illustrates reading lock attributes in accordance with one aspect of the present invention.

FIG. 21 is a flow diagram which illustrates setting lock attributes in accordance with one aspect of the present invention.

FIG. 22 is a flow diagram which illustrates resetting lock attributes of an object in accordance with one aspect of the present invention.

FIG. 23 is a flow diagram which illustrates obtaining device associations in accordance with one aspect of the present invention.

FIG. 33 is a block diagram illustrating another embodiment of a data storage device utilizing embedded location information in accordance with another aspect of the present invention.

DETAILED DESCRIPTION OF THE PREFERRED EMBODIMENTS

Figure 1:
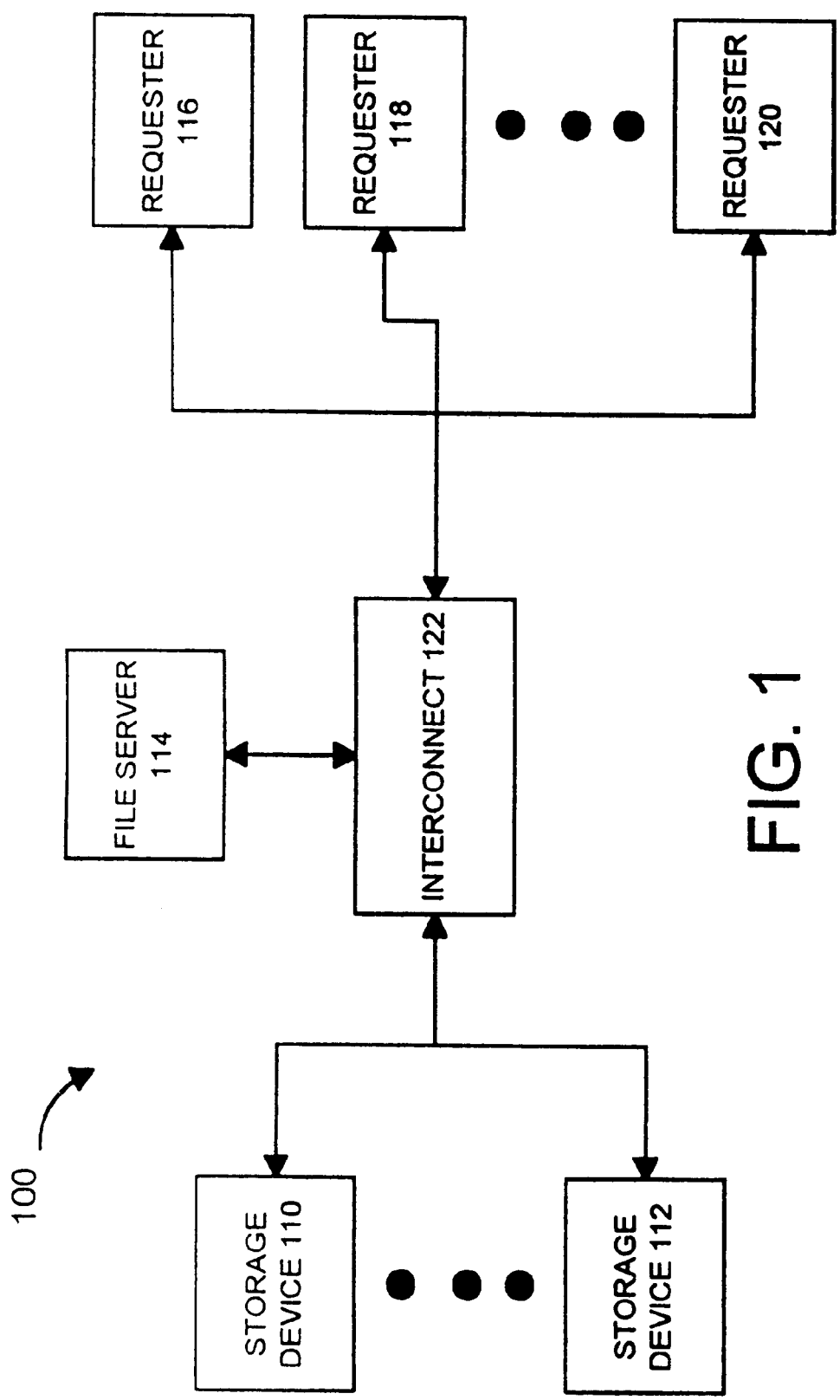
FIG. 1 is a block diagram of a network attached storage system in accordance with one aspect of the present invention.

FIG. 1 is a block diagram of a data storage system 100 in accordance with one aspect of the present invention. System 100 includes object oriented data storage devices 110 and 112, file server 114, requesters 116, 118 and 120, and interconnect 122. System 100 illustrates a network attached storage configuration which can be constructed of equipment and software from many different vendors, and which appear to users as a single large computer system.

Object oriented storage devices 110–112 are the storage components which perform the data storage function of System 100. Storage devices 110–112 preferably include disc drives, redundant arrays of independent discs (RAID) subsystems, tape drives, tape libraries, optical drives, juke boxes or any other storage device which can be shared. Storage devices 110 and 112 are also provided with an input/output (I/O) channel attachment to requesters 116, 118 and 120, which will access devices 110 and 112.

Requesters 116, 118 and 120 are components, such as servers or clients, which share information stored on devices 110 and 112. Requesters 116–120 are also preferably configured to directly access the information on storage devices 110 and 112.

File server 114 performs management and security functions, such as request authentication and resource location. In smaller systems, a dedicated file server is preferably not used. Instead, one of requesters 116–120 assumes the function and responsibility of overseeing the operation of system 100 carried out by file server 114. In addition, where security and functionality provided by file server 114 is not needed or desired, or where an overriding need for performance requires that the cluster of requesters 116–120 talk directly with storage devices 110 and 112, file server 114 is eliminated from system 100.

Interconnect 122, in one preferred embodiment, is the physical infrastructure over which all components in network attached storage system 100 communicate with one another.

In operation, when System 100 is powered up, all devices preferably identify themselves either to each other or to a common point of reference, such as file server 114 or interconnect 122. For instance, in a Fiber Channel based system 100, object oriented storage devices 110 and 112, and requesters 116–120 log onto the fabric of the system. Any component of system 110, in such an implementation, which desires to determine the operating configuration can use fabric services to identify all other components. From file server 114, requesters 116–120 learn of the existence of storage devices 110 and 112 with which requesters 116–120 can have access. Similarly, storage devices 110 and 112 learn the location of information required to locate other devices in system 100 and the address which must be used to invoke a management service, such as backup. Similarly, file server 114, in one preferred embodiment, learns of the existence of storage devices 110 and 112 from the fabric services.

Depending on the security practice of a particular system 100, requesters 116–120, or any of them, may be denied access to some components of system 100. From the set of storage devices 110 and 112 available to each requester, that requester can then identify the files, data bases, and free space available to it.

At the same time, each component in system 100 preferably identifies to the file server 114 any special considerations associated with it. For example, any storage device level service attributes can be communicated once to file server 114, and all other components in system 100 then learn of those attributes from file server 114. For instance, a particular requester 116–120, may wish to be informed of the introduction of additional storage devices, subsequent to start up. Such an attribute may be provided, for example, when the requester logs onto file server 114. File server 114 then automatically advises that particular requester 116–120 whenever new storage devices are added to system 100. File sever 114 may then typically also pass to the requester other important characteristics such as whether the storage device is a RAID 5, mirrored, etc., storage device.

Figures 2, 3:
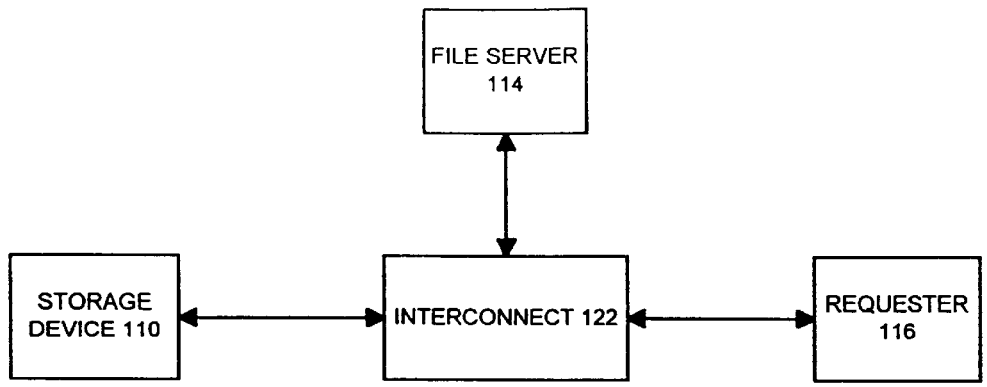

In accordance with one aspect of the present invention, the information stored on storage devices 110 and 112 is stored with a system better illustrated in FIG. 2. Each of storage devices 110 and 112 are preferably object oriented devices which operate in a mode in which data is organized and accessed as objects 124–126 rather than as an ordered sequence of sectors. The object oriented devices 110 and 112 manage objects 124–126 with an object file system which illustratively includes a single level list of the objects for each partition on the particular device. This is also referred to as a flat file system. The objects 124–126 which are stored on the storage medium in each device 110 and 112 are preferably the smallest visible units of capacity allocation on a device 110 or 112 which is operating in object oriented device mode. An object on such a storage device includes an ordered set of sectors associated with a unique identifier. Data is referenced by the identifier and an offset into the object. The object is allocated and placed on the storage media by the storage device 110 or 112, itself, while the operating system manages its files and metadata in these object constructs, instead of managing sectors of data, as it does in prior architectures.

The objects 124–126 are accessed by an interface 128 in which the objects expose a plurality of methods which can be invoked by a requester 116–120 in order to access and manipulate attributes and data in objects 124–126. Thus, as shown in FIG. 2, a request 130 is issued from a requester 116–120. In a preferred embodiment, requesters 116–120 are computer systems, or an element in a cluster or network of systems, which submits request 130 for action on a storage device which contains objects 124–126. Thus, requesters 116–120 may be both clients and servers. In any case, request 130 which is issued by one of requesters 116–120 invokes one of the methods in interface 128, which, in turn, causes the manipulation of one or more of objects 124–126, as will be described in greater detail later in the application.

FIGS. 3-1 and 3-2 are block diagrams of two different configurations which can be used to access objects stored on storage devices 110–112. For the sake of simplicity, only a single requester 116 and a single object oriented storage device 110 is illustrated in FIGS. 3-1 and 3-2. When requester 116 wishes to open an object (such as object 124–126) requester 116 may be able to directly access storage device 110, or it may be required to request permission from file server 114 and the location information, in order to access an object on storage device 110. The extent to which file server 114 controls access to storage device 110 is primarily a function of the security requirements of the particular implementation of system 100.

In the block diagram illustrated in FIG. 3-1, system 100 is assumed to be secure. That is, there is no requirement to protect the transmission of command information and data between requester 116 and storage device 110. In such an implementation, there still may be a file server 114 present for management functions, but file server 114 is not needed to oversee requester interaction with storage device 110.

In such an implementation, requester 116 is in a position to access and create objects directly on storage device 110. Requester 116 can thus open, read, write and close objects as if they were natively attached to requester 116. Such operations are described in greater detail later in the application. A brief overview is provided at this point, however, simply for the sake of clarity. In order to read an object on storage device 110, requester 116 may preferably first read from one or more objects which reveal the logical volumes or partitions on storage device 110, and how to begin searching for an object stored thereon. Requester 116 then opens and reads an object, which may be a root directory. From this object, locating other objects is straight forward, and is based on the contents of the root directory. Requester 116 repeats the process until the desired data is located. Data is referenced by an object identification (object ID) and a displacement within the object.

In a second implementation illustrated in FIG. 3-2, security is required. Therefore, file server 114 is interposed into the I/O chain between requester 116 and storage device 110, to a degree necessary for the desired level of protection. In one preferred embodiment, requester 116 must first request permission from file server 114 to perform a set of I/O operations. File server 114, (which may have withheld storage location information from requester 116 for additional security) then accredits the request from requester 116 by returning sufficient information to allow requester 116 to communicate directly with storage device 110. Since storage device 110 is preferably informed of the security parameters when storage device 110 logs onto file server 114, storage device 110 preferably does not allow an I/O request unless it is properly constructed and includes encoded data which includes valid permission from file server 114.

Then, the process proceeds in a similar fashion to that described which respect to FIG. 3-1. However, the payload associated with each command may be quite different. For example, in the case where security is required (showing FIG. 3-2) both commands and data which pass between requester 116 and storage device 110 may be encrypted. In addition, permission information must preferably be added to the command parameters provided from requester 116 to storage device 110.

Figure 4:
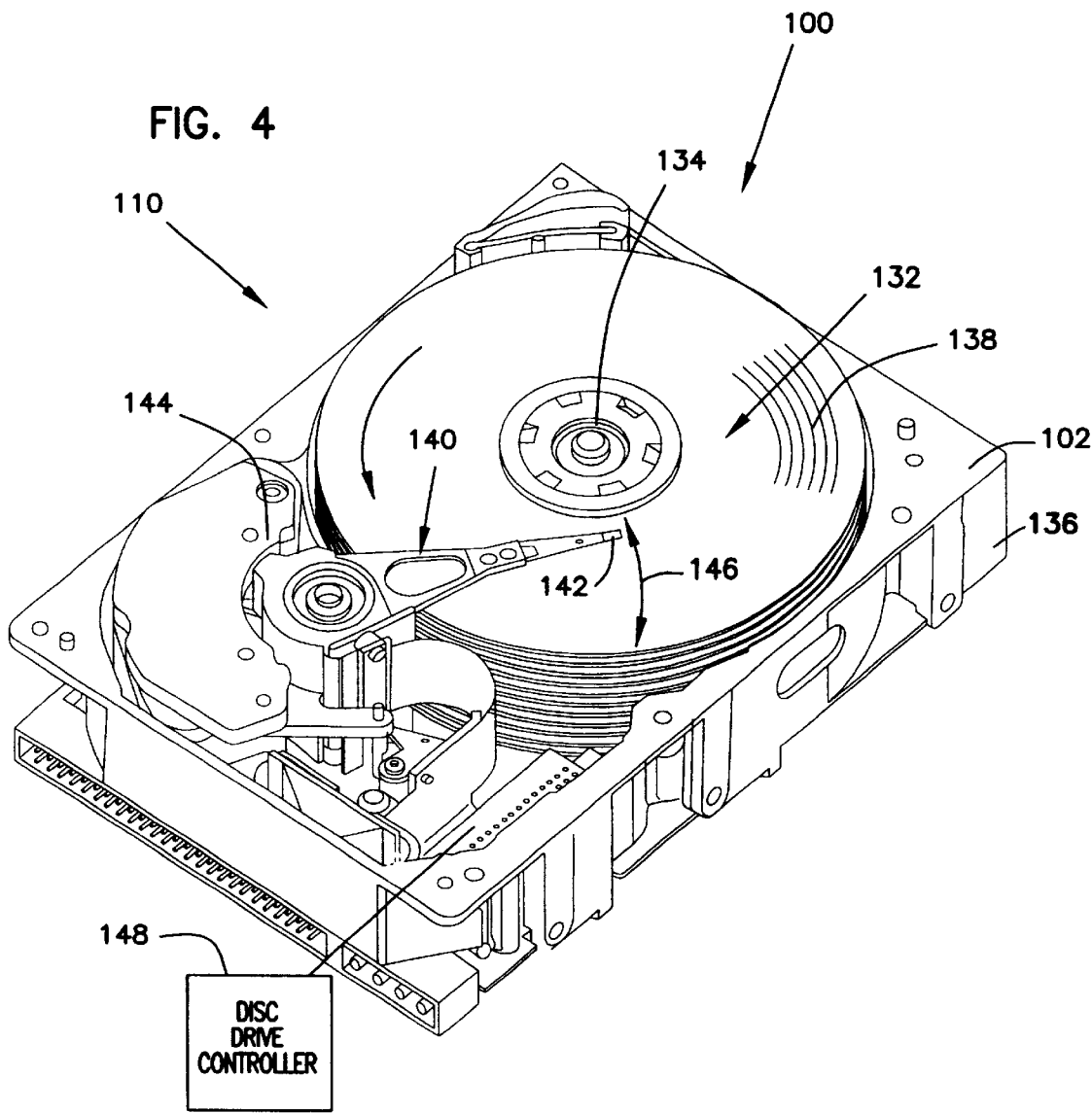
FIG. 4 is a perspective view of a disc drive in accordance with one aspect of the present invention.

Since storage devices 110 and 112 can, in one preferred embodiment, include hard disc drives, a brief discussion of a disc drive is in order. FIG. 4 is a perspective view of a hard disc drive, which can be implemented as storage device 110. In disc drive 110, a plurality of discs 132 are journaled about a spindle motor assembly 134 within a housing 136. Each disc 132 has a multiplicity of concentric circular recording tracks, indicated schematically at 138. Each track 138 is subdivided into a plurality of partitions (described in greater detail with respect to FIG. 6). Data can be stored on, or retrieved from, discs 132 by referring to a specific partition within a track 138. An actuator arm assembly 140 is rotatably mounted preferably in one corner of housing 136. The actuator arm assembly 140 carries a plurality of head gimbal assemblies 142, which each carry a slider having a read/write head, or transducer (not shown) for reading information from and writing information onto discs 132.

A voice coil motor 144 is adapted to precisely rotate the actuator arm assembly 140 back and forth such that the transducers on sliders 142 move across the surface of discs 132 along an arch generally indicated by arrow 146. FIG. 4 also illustrates, in block diagram form, a disc drive controller 148, which is used in controlling certain operations of disc drive 110 in a known manner. However, in accordance with the present invention, disc drive controller 148 is also used in implementing interface 128 to objects 124–126 stored on discs 132.

Figure 5:
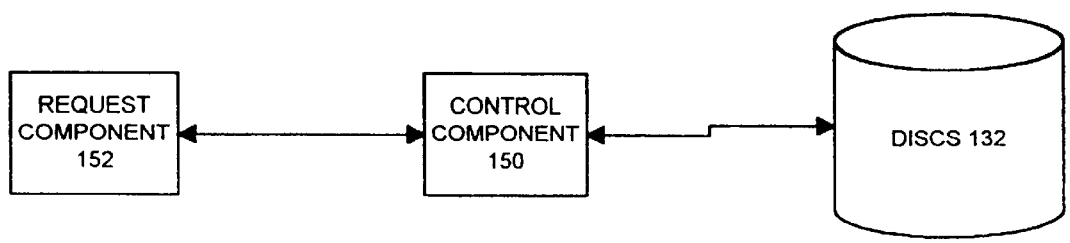
FIG. 5 is a functional block diagram illustrating access of an object by a requester.

FIG. 5 is a block diagram of a portion of disc drive 110 as it fits within system 100 shown in FIG. 1. In FIG. 5, disc drive controller 148 includes a control component 150 which implements interface 128. Objects 124–126 are stored on the storage medium which constitutes disc 132. Request component 152 is implemented on a requester 116–120, and is formed to logically formulate requests which invoke methods in interface 128. Control component 150, upon the invocation of a method, carries out certain tasks in order to manipulate identified objects in a desired way. Control component 150 returns an event, which can include data or attributes associated with any identified object. The event is also returned based upon the particular method invoked by the requester 116–120.

In order for object oriented devices 110–112 to provide the same functionality delivered by an operating system with block oriented devices, storage space on devices 110–112 must be manageable to a similar degree. Thus, in one preferred embodiment, an organizational layer on storage devices 110–112 is provided above objects 124–126 which are stored thereon. In one preferred embodiment, object oriented storage devices 110–112 provide for allocating disc space into one or more mutually exclusive regions, referred to as partitions. Partitions are described in greater detail with respect to FIG. 6. Within a partition, a requester 116–120 can create objects. In one preferred embodiment, the structure within a partition is a simple, flat organization. Onto this organization, any operating system can map its own structures.

Figure 6:
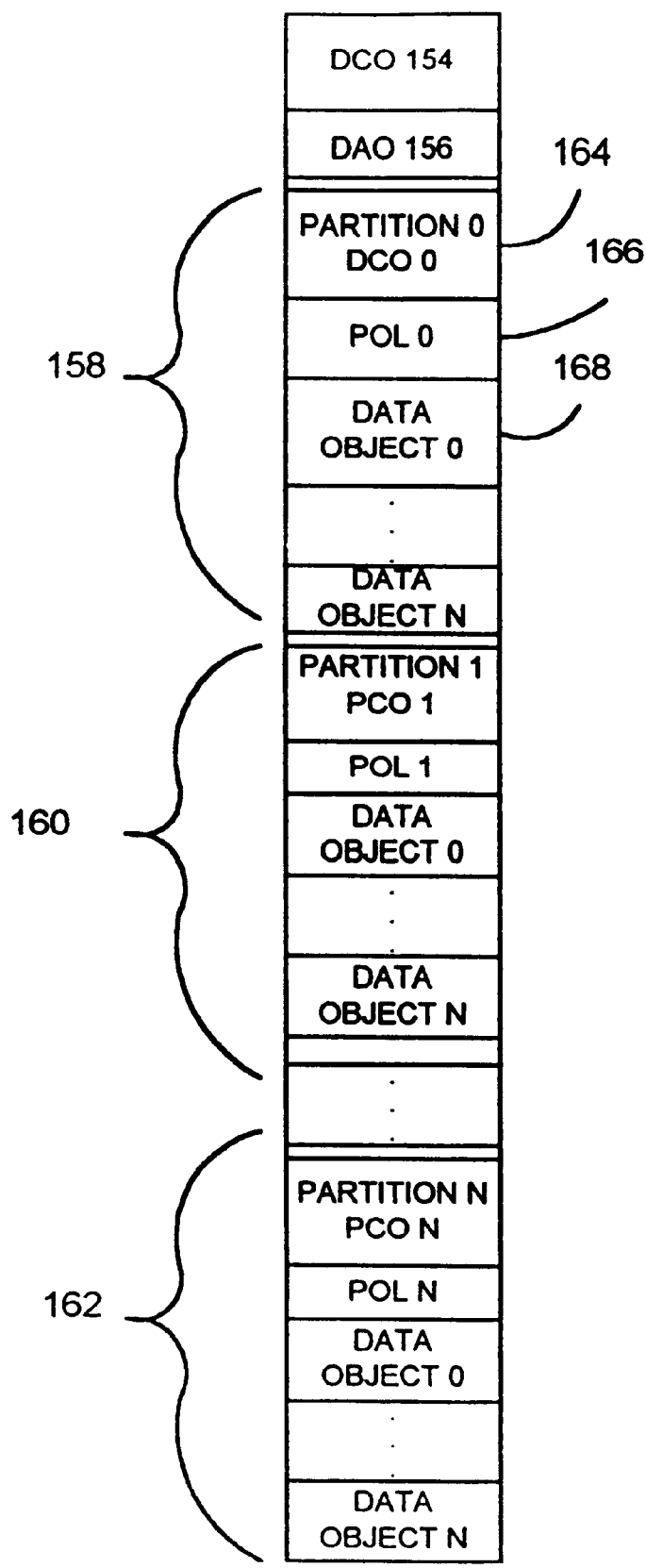
FIG. 6 illustrates a portion of a storage media partitioned in accordance with one aspect of the present invention.

FIG. 6 illustrates a portion of storage space on a storage medium, such as one of discs 132. The storage space includes a number of objects, such as a device control object 154, a device association object 156, and a plurality of partitions labeled as partition 0 (also designated by numeral 158), partition 1 (also designated by numeral 160) and partition N (also designated by numeral 162). Each partition also includes a number of objects such as partition control object 164, partition object list 166, and a plurality of data objects 168 (labeled data object 0-data object N).

Associated with each object is a set of attributes. In accordance with one aspect of the present invention, an access control attribute is provided which is set by a Set Attribute method (discussed in greater detail later in the application) and provides means by which access to a particular object is controlled. By changing the version number of the access control attribute, certain requesters 116–120 can be denied or given, access to the particular object.

The clustering object is an attribute which indicates whether the particular object should desirably be located near another object in the storage system. The cloning attribute indicates whether the particular object was created by copying another object in the storage system. A group of size attributes define the size characteristics of the particular object. For instance, the group of size attributes includes information indicative of the largest offset written within the object, the number of blocks allocated for the object, the number of blocks used to store data within the object and the number of bytes per block within the object.

A group of time attributes indicates when the object was created, the last time data in the object was modified, and the last time an attribute was modified in the object. The object also may preferably include a set of attributes which define the last time that any data in the file system was modified and that any attribute in the file system was modified. Other attributes can also be provided, in order to indicate other parameters, characteristics or features of any given object.

Each object is also associated with an object identifier which is chosen by the particular storage device 110–112 and returned to the requester 116–120 in response to the command to create an object. The identifier is preferably an unsigned integer of a specified length. In one preferred embodiment, the length of the identifier defaults to a size specified by a particular storage device 110–112, or it can be set as a device attribute. Further, in one preferred embodiment, a predefined subset of identifiers (Ids) is reserved for well known objects, special uses, and other special functions which may desirably be performed.

FIG. 6 illustrates that the storage medium typically includes a number of well known objects which always have a specific object ID. In some cases, such well known objects exist on every device or in every partition.

For example, one such well known object is the device control object 154, which preferably contains attributes maintained by each device 110–112, and which relate to the device itself or to all objects on the device. The attributes are maintained by the Set_Attribute method which is described later in the application. In one preferred embodiment, there is one device control object 154 per device 110–112.

Table 1 illustrates one set of preferable device control object (DCO) attributes.

TABLE 1

| Type | Name | Bytes | Semantics |
|------|------|-------|-----------|
| Security | Clock | 8 | monotonic counter |
|  | Master Key | 8 | master key, controlling device key |
|  | Device Key | 8 | device key, controlling partition keys |
|  | Protection Level | 1 | defines protection options |
| Partitions | Partition Count | 1 | Number of partitions on device |
| Device attr | Object Attributes | 8 | defines properties associated with all objects on device |

In one preferred embodiment, the DCO attributes include a clock which is simply a monotonic counter, a master key which includes the encryption key, or other master key which controls all other keys on the device, and a device key which controls partition keys and which may be used to lock partitions. The attributes also include a protection level key which identifies a predetermined protection level and which has associated security policies, a partition count which defines a number of partitions on the device, and object attributes which define properties associated with all objects on the particular device being accessed.

In order to adequately manage objects spanning multiple storage devices 110–112, each storage device 110–112 also preferably includes a device association object 156 which defines associations between various devices 110–112. For example, where storage devices 110 and 112 are a mirrored pair of devices, or members of an arrayed set, the device association object 156 identifies this relationship. Table 2 illustrates preferable attributes of the device association object 156.

TABLE 2

| Name | Bytes | Semantics |
| --- | --- | --- |
| Association Identifier | 2 | Unique ID of this set |
| Association Type | 2 | Kind of Association |
| Membership List | n | |
| Association Identifier | 2 | |
| Association type | 2 | |
| Membership List | n | |

Such attributes preferably include an association identifier, which is a unique identifier for each given set of associated devices. The attributes also preferably include an association type which defines the kind of association (eg, mirrored pair, RAID 5, etc.) between the devices. The attributes further preferably include a membership list which simply identifies the devices 110–112 which are members of the above-defined association.

Each partition 158, 160 and 162 on a storage device 110–112 also preferably includes the partition control object 164 which contains the properties of a single partition. Object 164 preferably describes not only the partition but also any object attributes that pertain to all objects in the partition. Each device 110–112 preferably includes one partition control object 164 for each partition defined on the device. While FIG. 6 illustrates partition control objects stored within each partition, this need not be the case. The partition control objects can be stored in the flat file system above the partitions instead.

Table 3 indicates a number of attributes which are preferably included in the partition control objects 168.

TABLE 3

| Type | Name | Bytes | Semantics |
| --- | --- | --- | --- |
| | Master Key | 8 | Encryption keys |
| | Current Working Key | 8 | |
| | Previous Working Key | 8 | |
| Part. attr | Object Attributes | 8 | defines properties associated with all objects in partition |

Such attributes preferably include a master key which defines an encryption key for the entire partition, and which can be used to set a current working key. The attributes also preferably include a current working key and a previous working key which are preferably used for encryption and decryption of command and data messages. Partition control object 164 also preferably includes object attributes which are associated with all objects in the designated partition.

FIG. 6 also illustrates that each partition preferably includes a partition object list 166 which is an object that is built by control component 150 when a partition is created on the storage medium. Partition object list 166 preferably has the same identifier in every partition, and constitutes the point of departure for navigating the object file system implemented on the storage medium. Table 4 illustrates a list of attributes preferably associated with each partition object list.

TABLE 4

| Field | Bytes | |
| --- | --- | --- |
| OBJECT ID | 8 | ID used for any OPEN, READ, WRITE, CLOSE on this OBJECT |
| User Data | N | POL Attribute sets this, use GET ATTRIBUTE to learn value |

As illustrated in Table 4, the object preferably includes a list of object identifiers (or object IDs) for all objects resident in the partition, and the volume of user space allocated to each object. The object identifier is used by a requester in order to open, read, write and close an object. In addition, the user can preferably allocate user space for each object ID by setting the user data attribute in the partition object list. After the partition object list 166, each partition preferably includes a plurality of data objects 168. Each of the data objects 168 preferably includes one or more of the attributes set out in Table 1, and can include additional attributes, depending on the specific implementation of the data storage system.

Figures 1, 7:
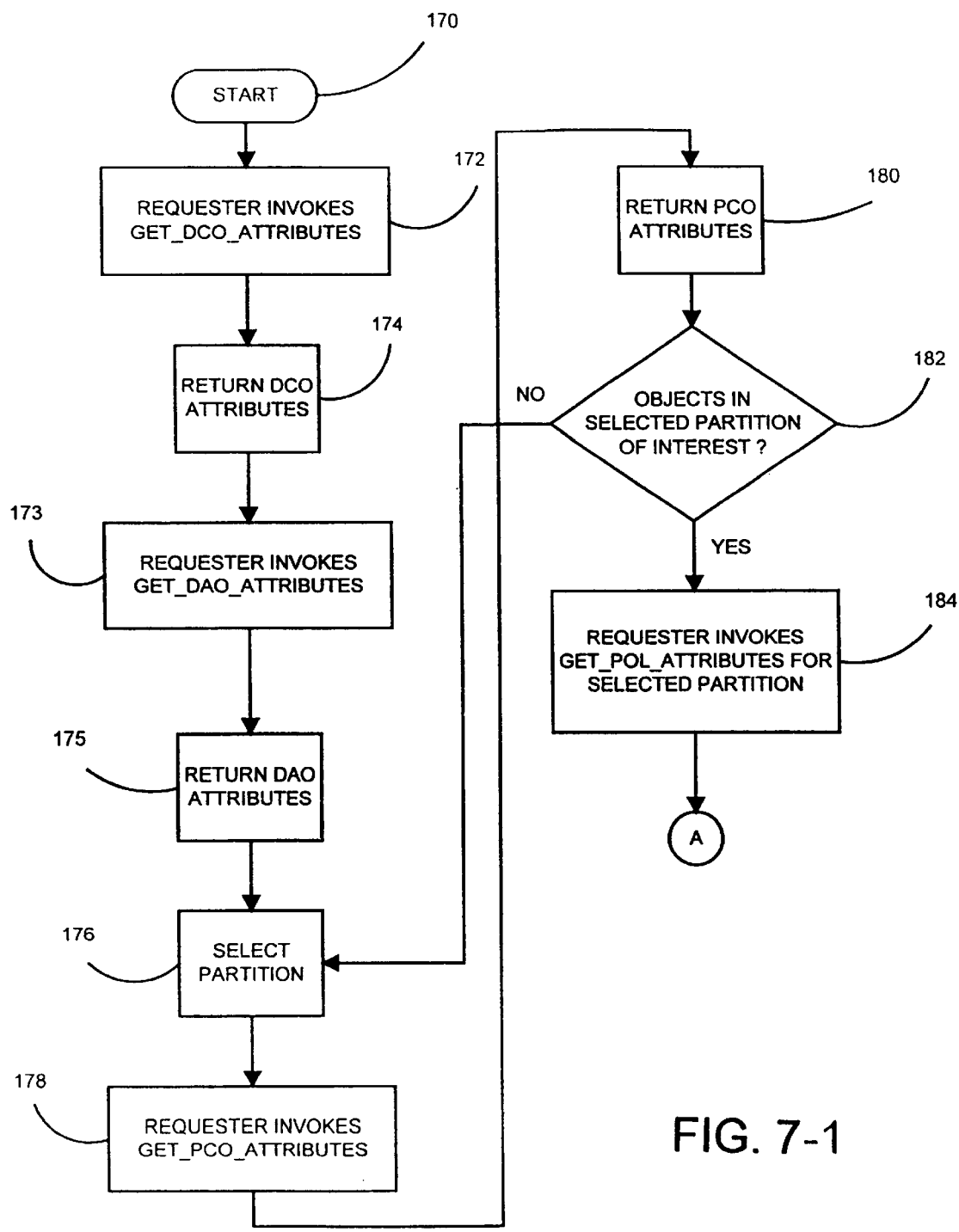
Figures 2, 7:
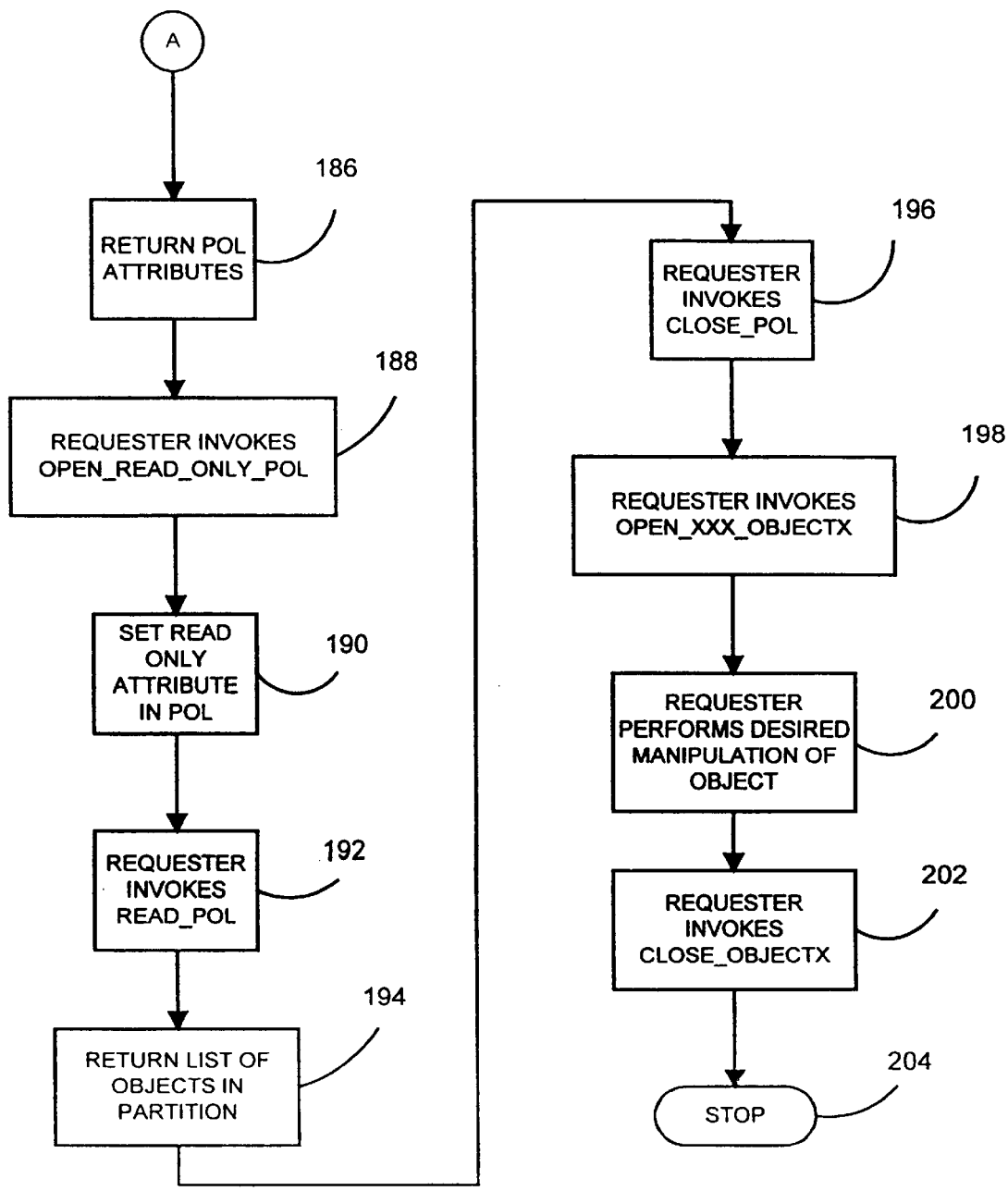

The object oriented storage devices 110–112 preferably support requests to provide data to, or store data for, a requester 116–120. Moreover, storage devices 110–112 preferably assume responsibility for other functions that would have been done at other components, most likely in the operating system, in prior art architectures. Space management, as well as the maintenance of the attributes associated with objects on devices 110–112, is preferably performed by devices 110–112 themselves. Such functions are preferably performed by invoking methods supported by interface 128 which is implemented by control component 150 in each of storage devices 110–112. A number of the methods which can be invoked are discussed in greater detail later in the specification. However, in order to facilitate a better understanding of such methods, FIGS. 7-1 and 7-2 provide a flow diagram which illustrates the navigation of the object oriented file system in accordance with one aspect of the present invention. It is believed that discission of FIGS. 7-1 and 7-2, prior to a detailed discussion of each of the methods which is set out below, will facilitate understanding of the present invention.

FIGS. 7-1 and 7-2, extending from blocks 170–204, illustrate finding an object in a specified partition on one of storage devices 110–112. First, the requester 116 obtains the device attributes in device control object 154. This is indicated by block 172. Invocation of the Get_DCO_Attributes method causes control component 150 to return the attributes stored in the device control object 154. This is indicated by block 174. Requestor 116 then selects a given partition based upon the attributes returned from the device control object 154. This is indicated by block 176.

Once the partition is selected by requester 116, requester 116 then invokes the Get_DAO_Attributes method as indicated by block 173. This causes control component 150 to obtain the attributes from the device association object 156 stored on storage medium 110. Control component 150 then returns the device association attributes to requestor 116 as indicated by block 175. Based on the device association attributes and the device control attributes, requester 116 selects a partition to interrogate. This is indicated by block 176.

Requestor 116 then invokes the Get_PCO_Attributes method which causes control component 158 to obtain the attributes found in the partition control object 164 which is associated with the specific partition to be interrogated by requester 116. This causes control component 150 to obtain and return the partition control object attributes. This is indicated by blocks 178 and 180. If the objects in the selected partition are not the objects which are of interest to the requester, then the requester selects another partition as indicated in blocks 182 and 176.

However, assuming that the requester 116 has found the partitions of interest, then the requester invokes the Get_POL_Attributes for the selected partition, as indicated in block 184. This method causes control component 150 to obtain the attributes from the partition object list 166 associated with the selected partition. These attributes are then provided to requester 116 as indicated in block 186.

Next, the requester 116 invokes an Open_Read_Only_POL method. This is indicated by block 188. As is discussed in greater detail below, the control component 150 obtains the data stored in the partition object list 166, associated with the selected partition, but modifies an attribute in that object to indicate that the data is being provided on a read only basis such that the data cannot be modified or extended. This is indicated by block 190.

The requester then invokes the Read_POL method which causes control component 150 to tender the list of objects in the selected partition for review by requester 116. This is indicated by block 194. After choosing the desired objects in the selected partition, the requester 116 invokes the close_POL method which causes the control component 150 to close the partition object list. This is indicated by block 196.

Having discovered the object ID for the desired object or objects, requester 116 then invokes the Open_xxx_Objectx method. The xxx indicates a specific open method which is invoked by the requester, based upon the particular data manipulation desired by the requester. The Objectx indicates the object ID from the partition object list which identifies the object to be manipulated or accessed by the requester. The xxx designation, for example, can represent an Open_Update operation, or an Open_Read-Only operation. These are discussed below, and this step is indicated by block 198.

The requester then performs the desired manipulation of the object returned by control component 150. Various methods which can be used to manipulate the objects are discussed in greater detail below. This is indicated by block 200.

Finally, once the desired object manipulation or access is completed by the requester, the requester 116 invokes the Close_Objectx method which is also described in greater detail below, and which operates to close the object which was accessed by requester 116.

FIGS. 8–24 are flow diagrams illustrating various exemplary methods which can be invoked by a requester in order to accomplish desired functions and desired manipulations of objects stored on an object oriented storage device, such as device 110.

Figure 8:
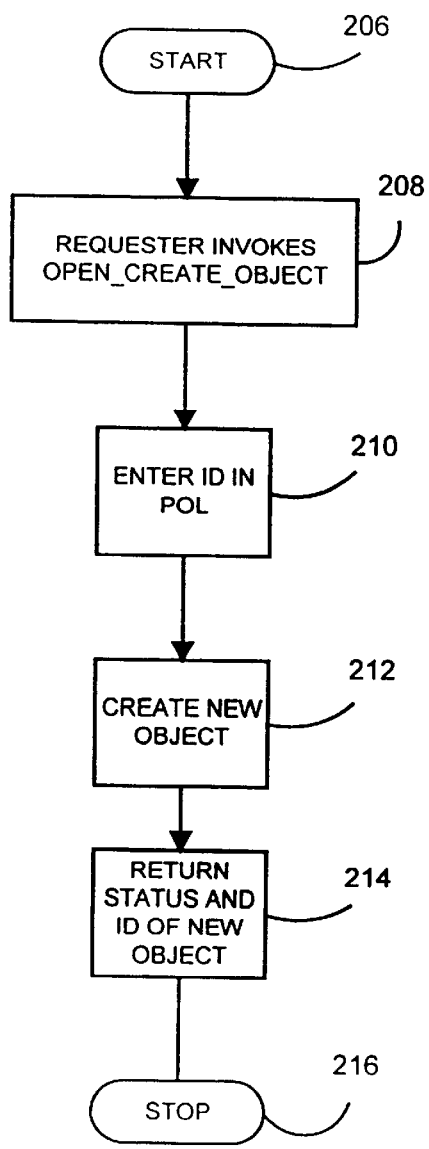
FIG. 8 is a flow diagram illustrating creation of an object in accordance with one aspect of the present invention.

FIG. 8 is a flow diagram specifically illustrating an Open_Create_Object method. When a requester 116 invokes this method, as indicated in block 208, control component 150 creates a new object ID and enters the object ID in the partition object list associated with the specific partition in which the object is to be created. This is indicated by block 210. Control component 150 then creates a new object by allocating the number of blocks, etc., associated with the object, and by modifying the object attributes to indicate the time of object creation and to set other attributes listed in Table 1 and associated with the object. This is indicated by block 212. Next, control component 150 returns the status of the request along with the new ID of the object which has just been created. This is indicated by block 214.

In addition to simply creating an object, requester 116 can specify a number of options. For example, in one preferred embodiment, requester 116 can specify whether the object is password protected, whether the object is to be encrypted, certain quality service thresholds (eg, whether the object is to be backed up), lock characteristics (eg, whether the object is to be locked by an object lock as well as any other locks, such as partition and device locks), the access control version, mirror or other backup support (which will cause all updates to be mirrored onto another object, or backed up in another way which is specified), to indicate that space will be allocated in units of a specified minimum size, and to set collision characteristics (such as write in a UNIX-type system).

The particular information which requester 116 provides to control component 150 in order to invoke this method includes permission information in systems which require this for security, the partition of the device in which the object is to be created, and any of the options mentioned above. In response, control component 150 returns, in one illustrative embodiment, the capacity available on the device, the status of the request, along with the ID of the new object.

It should also be noted that a special instance of this method can be invoked, which includes all data associated with an object. In that case, one method can be invoked which can create an object, write to the object, and close the object.

Figure 9:
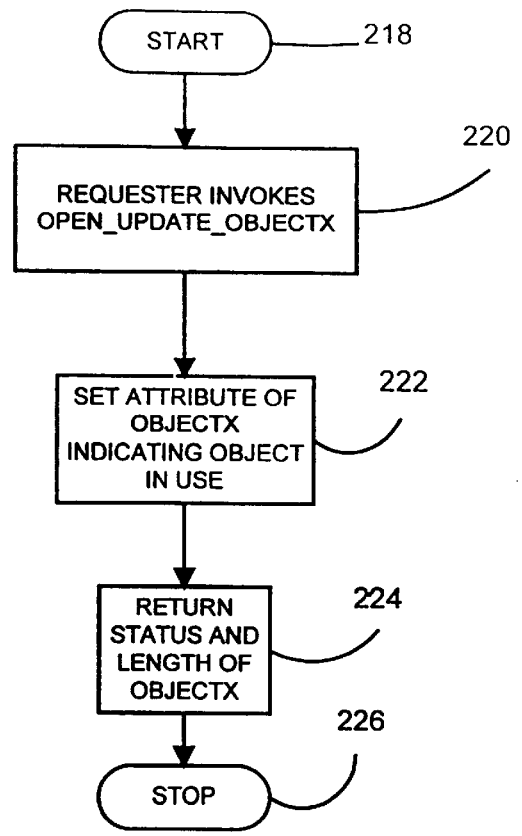
FIG. 9 is a flow diagram illustrating opening and updating of an object in accordance with one aspect of the present invention.

FIG. 9 is a flow diagram illustrating an Open_Update_Objectx method. When the requester 116 invokes this method, as indicated by block 220, this allows requester 116 to read and write the specified object. It also provides for extending the length of the object. When the method is invoked, control component 150 sets an attribute in the specified object indicating that the object is in use. Requester 116 provides permission information, the partition ID containing the object, the identifier of the object to be accessed, the type of action to be taken (such as update or write) and any of the options mentioned above. In response, control component 150 returns the status of the request and the length of the specified object, along with remaining capacity available to the requester 116.

FIG. 10 is a flow diagram illustrating a Write_Object method. When requester 116 invokes this method, as indicated by block 242, this causes control component 150 to write to a specified number of blocks in the designated object at the location specified.

A write method can also cause other methods to be invoked. For example, if parity support is called for on the device 110–112 to be accessed, a write can automatically invoke an Exclusive Or method which performs an Exclusive Or operation on the data to be written, and parity data to be written to one or more previously specified parity devices.

In order to invoke this method, the requester 116 provides permission information, an object identifier, a partition ID, a starting location of blocks to be written within the object, a number of blocks to be written to the object, option information, and the data to be written. Once this method is invoked, control component 150 modifies the specified object with the specific data provided. This is indicated by block 244. Control component 150 then modifies necessary attributes in the specified object such as the length of the object, the time stamps associated with the object, etc. This is indicated by block 246. Control component 150 then modifies necessary attributes of other objects, such as the partition object list, where needed. This is indicated by block 248. Control component 150 then returns the status of the request to the specific requester. This is indicated by block 250.

FIG. 11 is a flow diagram illustrating an Open_Read_Only_Objectx method. When this method is invoked, control component 150 allows the requester 116 to have access to the specified object for read only purposes. Thus, when this object is invoked, as indicated by block 230, the requester provides permission information, a partition ID, an object ID, and option information. Control component 150 then sets an attribute in the specified object indicating that the object is in use. This is indicated by block 232. Control component 150 then sets a read only attribute in the object indicating that the object cannot be written by the requester. This is indicated at block 234. The control component 150 then returns the status of the request and the length of the specified object. This is indicated by block 236.

Figure 12:
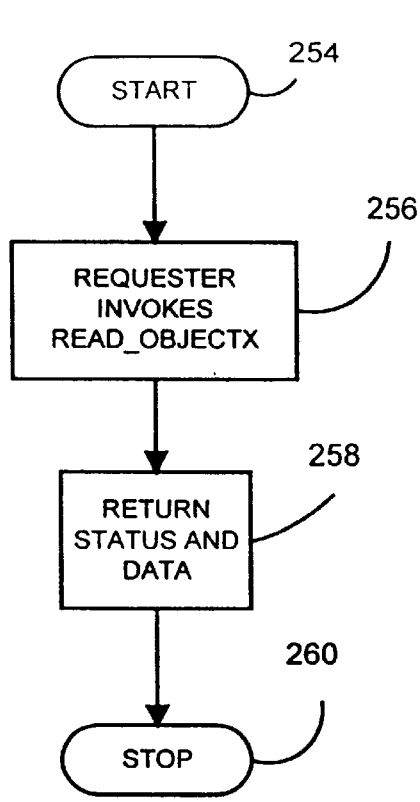
FIG. 12 is a flow diagram which illustrates reading an object in accordance with one aspect of the present invention.

FIG. 12 is a flow diagram illustrating a Read_Objectx method. This method is invoked by the requester 116 when requester 116 desires device 110 to return data from the specified object. The requester provides permission information, an object ID, a partition ID, a starting location of blocks to be read, a number of blocks to be read, and any other desired option information. In response, control component 150 returns the status of the request, the length of data being returned, and the actual data being returned in response to the method. This is indicated by blocks 256 and 258.

Figure 13:
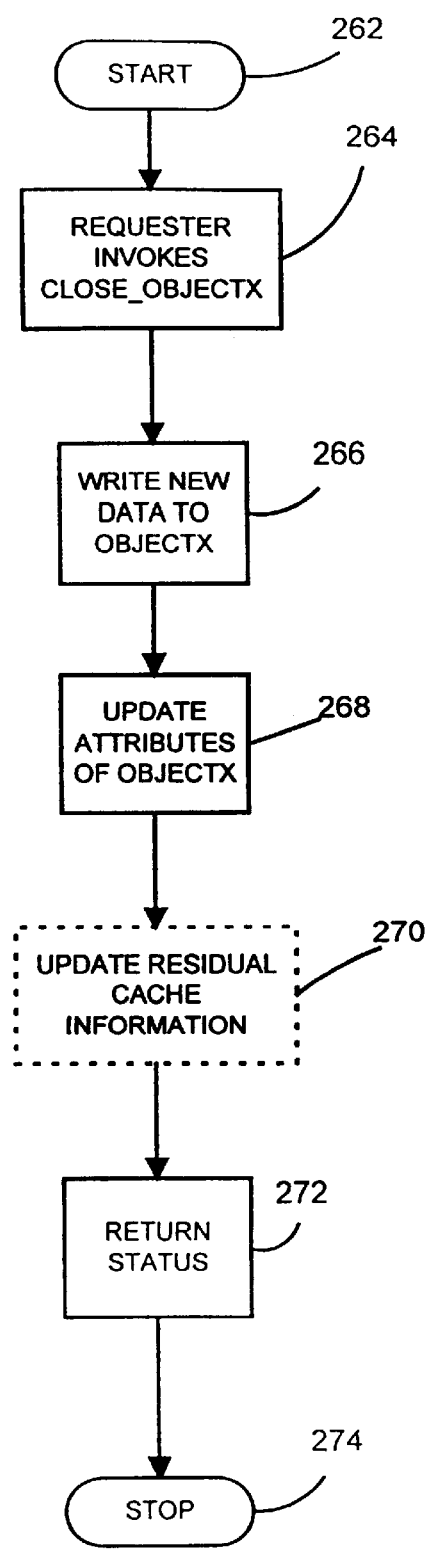
FIG. 13 is a flow diagram which illustrates closing an object in accordance with one aspect of the present invention.

FIG. 13 is a flow diagram illustrating a Close_Objectx method. When this method is invoked by a requester 116, as indicated by block 264, the requester provides permission information, an object ID, and any desired option information. In response, control component 150 modifies the data in the specified object as indicated by block 266. In addition, any changes to the object as a result of writing to the object, if not already written to the storage media, are written at this time. Control component 150 also updates attributes of object x as indicated by block 268. For example, if the object is a newly created object, its attributes are updated with the time of creation, and other required attribute information. In addition, the attributes are modified to indicate the last time that the data in the object was modified, the length of the data, if it was changed, and an attribute is set by control component 150 which indicates that the object is no longer in use by a given requester.

Control component 150 can also, optionally, update residual cache information associated with the object and reflected in an object attribute. This is indicated by block 270. For example, if the specific requester 116 making the request is configured to inform the storage device 110 that data is still being cached for the closed object, or is no longer being cached, the operating system of storage device 110 can retain the cache information for those applications where objects will be closed and opened again in quick succession. At the same time, however, the storage device 110 can keep track of whichever components in System 100 may need to be informed in the event of coherency collisions, should another requester request access to this object in the meantime. Control component 150 then returns the status of the request as indicated by block 272.

Figures 14, 15:
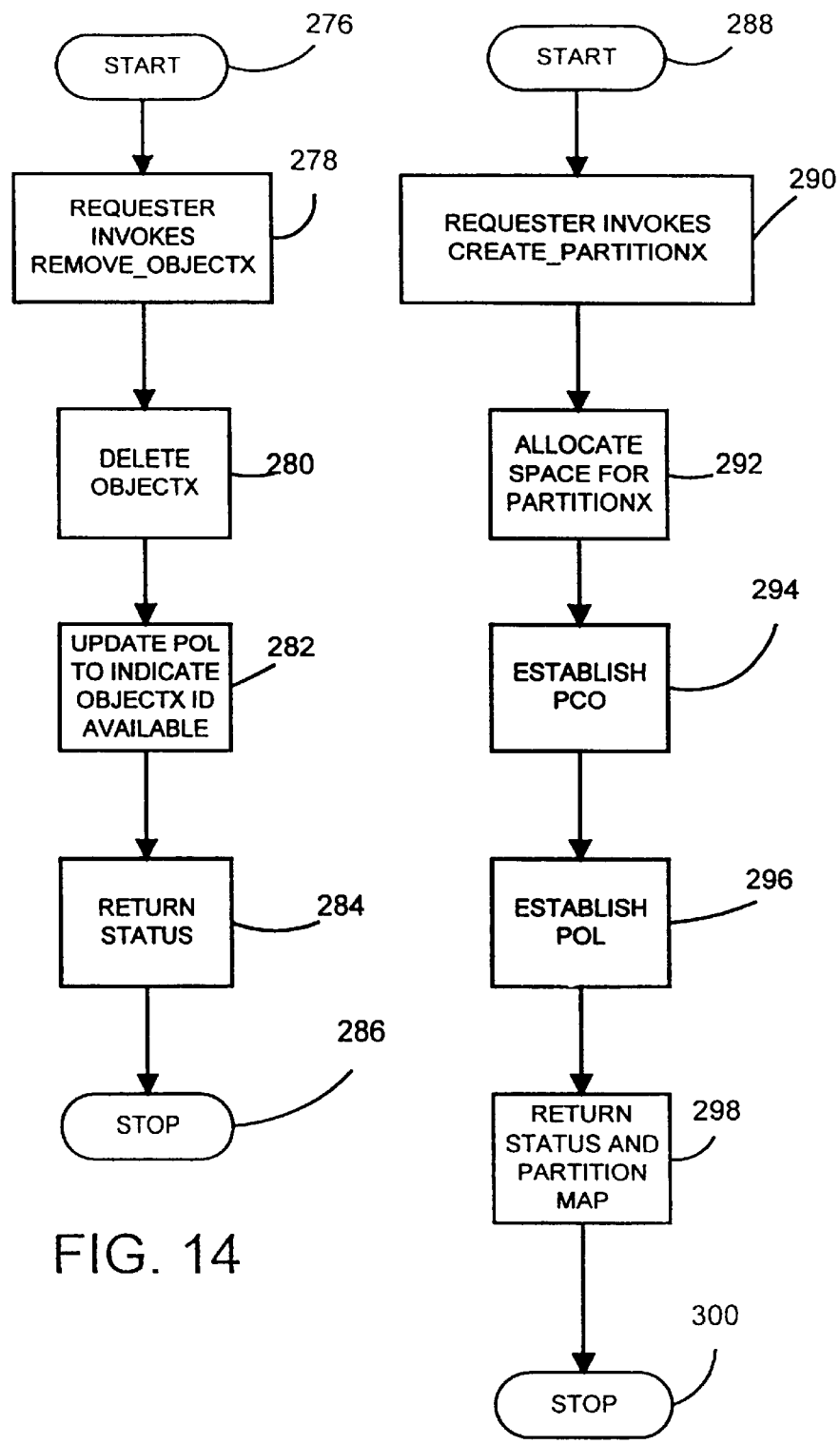
FIG. 14 is a flow diagram which illustrates removing an object in accordance with one aspect of the present invention.
FIG. 15 is a flow diagram which illustrates creating a partition in accordance with one aspect of the present invention.

FIG. 14 is a flow diagram illustrating the Remove_Objectx method. When this method is invoked, as indicated at block 278, control component 150 takes the necessary steps to delete the object from the storage medium. This is indicated at block 280. Control component 150 then modifies the partition object list associated with the partition from which the object was deleted, in order to reflect that the specified object ID is available. This is indicated by block 282. Control component 150 then returns the status of the request, as indicated by block 284. In order to invoke this method, requester 116 provides permission information, a partition ID, an object ID, and any desired option information. Control component 150 then returns the status of the request as indicated by block 284.

FIG. 15 is a flow diagram illustrating the Create_Partitionx method which can be invoked by a requester, as indicated by bock 290, in order to create a partition on storage device 110. It should be noted, that while the Create_Partitionx method partitions the drive into one or more regions, all space on the storage media need not be accounted for. In addition, partition regions can also span various zones on a disk.

In one embodiment, this method is used to create partitions in a tiling arrangement, with the partitions representing true divisions of the storage space on the device. This arrangement is used to divide the space by service levels such as data array. Such partitions cannot be resized, but can be removed and recreated.

In accordance with another aspect of the present invention, the partitions are used as a logical partitioning in order to organize objects logically rather than manage the space according to service levels. In this second embodiment, the partitions can be resized dynamically.

In order to invoke the method, the requester provides permission information, any desired options, a partition ID, and an initial space allocation which identifies space to be allocated to the specific portion identified. In response, control component 150 allocates space on the storage media for the specified partition, as indicated in block 292. The control component 150 then establishes a partition control object and a petition object list, as indicated by blocks 294 and 296. As discussed above, the partition object list cannot be removed and serves as a starting point for navigating objects in the partition. Control component 150 then returns the status of the request and a partition map illustrating the partitioning which has been conducted. This is indicated in block 298.

Figures 16, 17:
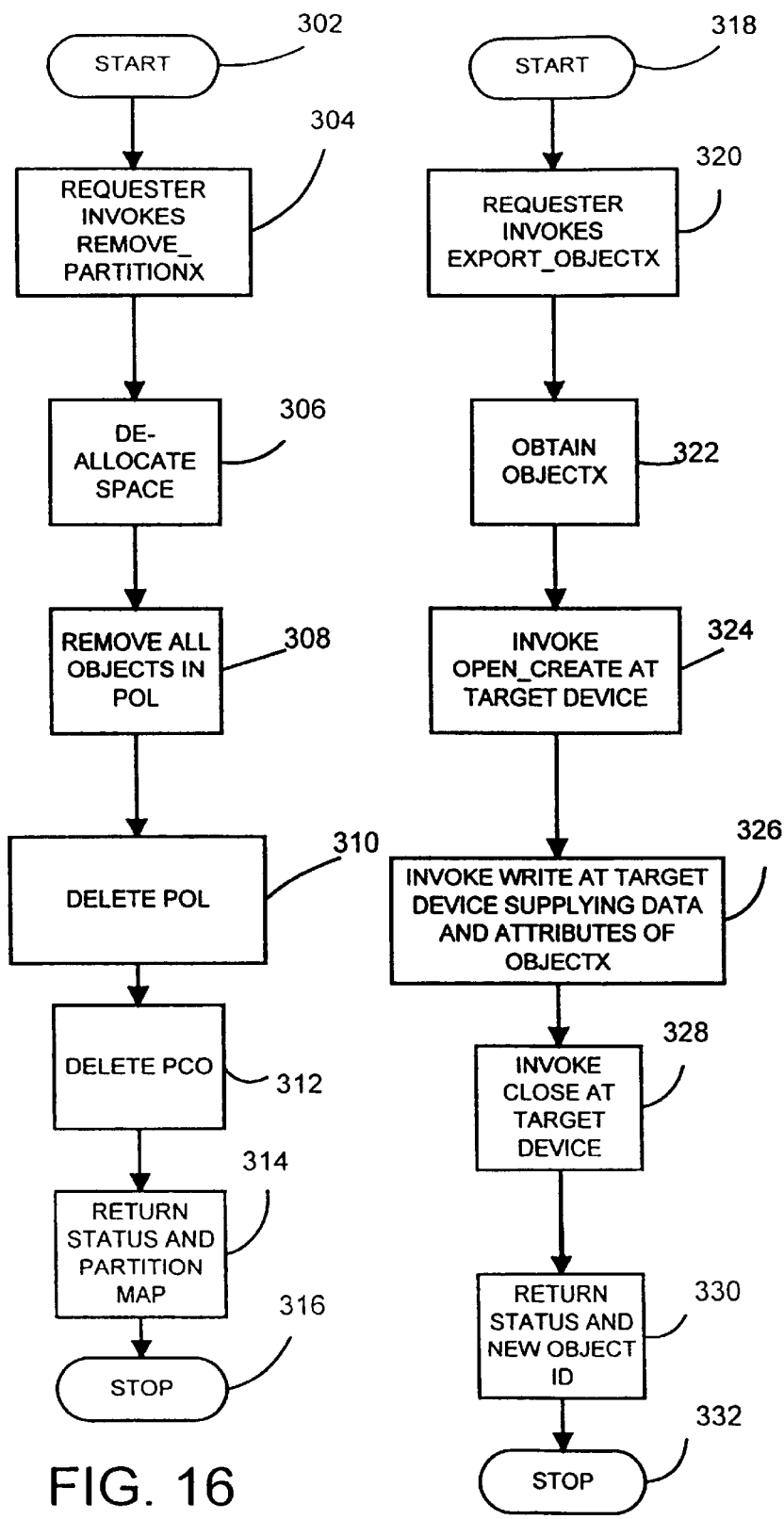
FIG. 16 is a flow diagram which illustrates removing a partition in accordance with one aspect of the present invention.
FIG. 17 is a flow diagram which illustrates exporting an object in accordance with one aspect of the present invention.

FIG. 16 is a flow diagram illustrating the Remove_partitionx method. In order to invoke this method, requester 116 provides permission information, option information, and a partition ID identifying the partition to be removed. This is indicated in block 304. In response, control component 150 de-allocates space previously associated with the partition as indicated in block 306. Control component 150 then removes all objects in the partition object list associated with the partition to be deleted, deletes the partition object list and deletes the partition control object. This is indicated by blocks 308, 310 and 312. Control component 150 then returns the status of the request and the partition map showing changes made to the partitioning. This is indicated by block 314.

In accordance with one aspect of the present invention, data management policies are communicated to each storage device 110–112, so that the storage devices can act independently of one other to execute the management policies. This provides significant advantages in that it results in not only less human intervention, but also more predictable and timely management control.

For example, data on the storage devices 110–112 may desirably be backed up each week. Conventional systems are typically backed up during an idle period on weekends, such that the system availability is not interrupted during a business week. However, the window of availability has been gradually shrinking at the same time the system capacities have been increasing. Thus, the problem of attempting to find time to interrupt a system long enough to back up possibly terabytes, of data has become very difficult.

Thus, in accordance with one aspect of the present invention, by taking action on an object based on attributes assigned to it, an object oriented storage device 110–112 can inform a backup function whenever an object has reached the correct state for its backup to be taken. Also, the backup of all files can be spread over a longer period—during which others are still being updated-without affecting data integrity.

Other examples of attributes which can invoke action by an object oriented storage device 110–112 include encryption, compression, versioning and parity redundancy. In each of these examples, the storage device 110–112 preferably need only be informed of the policy with respect to a specific object or set of objects. The device itself can then perform the function or inform an agent designated to provide the service.

For instance, compression and encryption can be performed on the storage device 110–112 itself. Therefore, the only thing which need be communicated to the device, is the fact that compression or encryption is required for an object. For a management function which is performed by an agent, not only the management function policy must be communicated to the storage device, but also an identification of an agent to perform the function, such that the agent can be accessed by the storage device when it is time to perform the function.

In accordance with one aspect of the present invention, associations are established among objects so that those with the same attributes or with dependencies can be identified. For example, assume a database includes 6 files or objects, none of which can be backed up until either all have been closed or until one designated as the object on which all of the others are dependent has been closed. A file server 114 may be needed to manage this kind of relationship between objects. In addition, the present invention also establishes inter-device dependencies as in the case of an arrayed parity set. By making it possible to establish groups in which one device or object makes certain that the rest of the group has the same essential properties, management of the group is more efficient and effective.

FIGS. 17–24 are flow diagrams which illustrate management functions which can be performed by invoking methods exposed by the objects on the storage devices. Invoking the methods causes control component 150, and/or related control components, to take steps in order to perform the management functions associated with the invoked methods.

FIG. 17 is a flow diagram illustrating the Export_Objectx method. Requester 116 invokes this method, as indicated by block 320, by providing permission information, option information, an object ID, a target device ID and a target partition ID. The export method enables a storage device 110–112 to take action based on rules expressed in attributes associated with a given object. For example, it can be used to initiate a backup or support versioning of objects to other devices.

When the Export_Objectx method is invoked, control component 150 obtains the specified object from the storage media as indicated by block 322. Control component 150 then invokes an Open_Create method at a target device specified by requester 116. This is indicated by block 324. Control component 150 then invokes a write method at a target device supplying data and attributes of the specified object. This is indicated by block 326. Control component 150 then invokes a Close method at the target device closing the object on the target device after it has been written to the target device. This is indicated by block 328. Finally, control component 150 returns the status of the request to the requester, along with the new object ID of the object which has been written to the target device. This is indicated by block 330.

Figure 18:
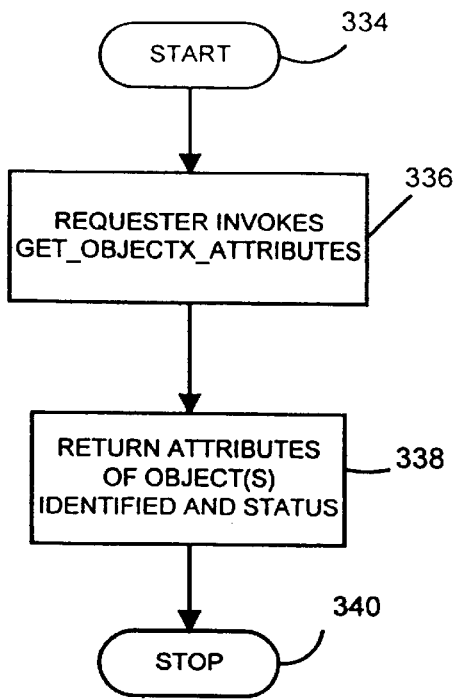
FIG. 18 is a flow diagram which illustrates obtaining object attributes in accordance with one aspect of the present invention.
Figure 19:
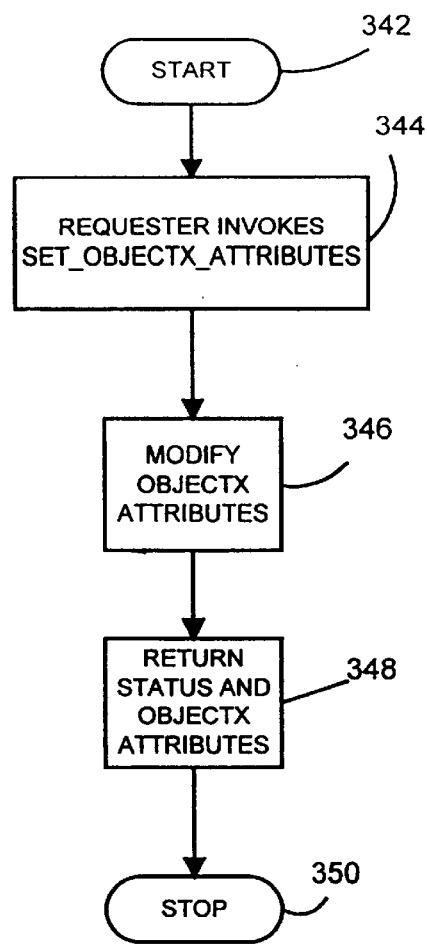
FIG. 19 is a flow diagram which illustrates setting or modifying object attributes in accordance with one aspect of the present invention.

The interface 128 implemented by control component 150 also supports methods which allow a requester to obtain object attributes for review, and to set object attributes. FIGS. 18 and 19 are flow diagrams which illustrate the corresponding Get_Objectx_Attributes and Get_Objectx_Attributes methods respectively.

The method illustrated in FIG. 18 once invoked as indicated by block 336, causes control component 150 to obtain attributes for a specified object. In one illustrative embodiment, the requester provides permission information, an object ID, or a list of object IDs, and option information. Control component 150 then obtains the attributes associated with the object ID, or the list of object IDs, and returns those attributes, along with a status of the request to the requester. This is indicated by block 338.

The Get_Objectx_Attributes method illustrated in FIG. 19 can be invoked as indicated in block 344, by a requester providing permission information, an object ID, and option information to control component 150. Control component 150 then modifies the attributes of the specified object with the information provided by the requester, and returns a status of the request, along with the attributes of the specified object, as modified. This is indicated by blocks 346 and 348.

In accordance with another aspect of the present invention, objects can be locked so that they can only be accessed once they are unlocked by a server that owns the lock that has been placed on the object. In one illustrative embodiment, objects can be locked at the object level, the partition level, or the device level. The lock mechanism provides for inter-server access resolution. Such locks, in one preferred embodiment are used for scheduling concurrent updates as well as prohibiting access during maintenance functions. FIGS. 20, 21 and 22 are flow diagrams illustrating lock methods which can be thought of as instances of the Get_Attribute and Set_Attribute methods. However, additional detail is provided for these specific instances of those methods, such that they can be used in the sharing of data among the cluster of requesters.

FIG. 20 is a flow diagram illustrating the Read_Lock_Attributes method. This method can be invoked, as illustrated by block 354, by providing permission information, object, partition or device ID, lock parameters, and any desired option information from a requester 116 to control component 150. In response, control component 150 determines whether the specified object has a lock which is set. Control component 150 then returns the status of the request of a requester owning the lock. This is indicated by block 356.

FIG. 21 is a flow diagram illustrating the Set_Lock_Attributes method. This method can be invoked by a requester, as indicated by block 362, by providing permission information, object, partition or device identifier information, lock parameters and option information. When this method is invoked, control component 150 inspects a lock associated with the identified object. This is indicated by block 364. The control component then attempts to perform a lock or unlock operation with the requester's identification. This is indicated by block 366. If the requester requesting the operation is the owner of the lock, then the operation will be performed. If not, the operation will not be performed. In any case, control component 150 returns a status of the request along with the ID of the server which owns the lock. This is indicated by block 368.

FIG. 22 is a flow diagram illustrating the Reset_Lock_Attribute method. This function is used in an attempt to reset a lock in an event that the server which owns the lock is no longer functioning. The method can be invoked, as illustrated by block 374, by providing permission information, object, partition or device identifier information, lock parameters, and any desired option information. In response, control component 150 locks the specified object, partition or device, as indicated by block 376, and returns the status of the request along with the identification of the server which owns the lock. This is indicated by block 378.

Figure 24:
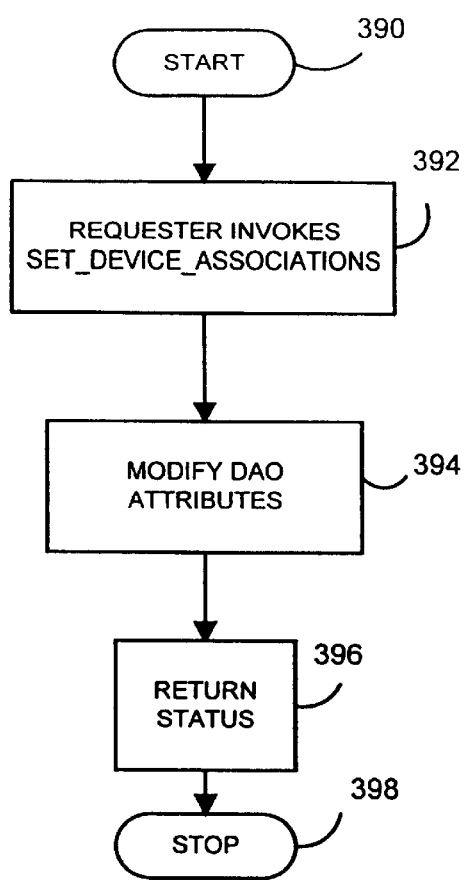
FIG. 24 is a flow diagram which illustrates setting device associations in accordance with one aspect of the present invention.

FIGS. 23 and 24 are flow diagrams illustrating Get and Set_Device_Association methods. These methods define or interrogate relationships among devices 110–112. One illustrative implementation of such relationships includes that one of the storage devices 110–112 is identified as a master of a first set of devices, and others being dependent members of that set. The first or master of the set, is responsible for disseminating to the other members changes in set attributes. Other members reject attribute settings if they are not provided from the first or master of the set. In order for storage devices 110–112 to perform these functions, they are provided with the ability to perform a self-inspection. This allows the devices to inspect themselves to determine whether they are included in a membership of a larger device group.

In FIG. 23, the Get_Device_Associations method is illustrated. This method can be invoked, as indicated by block 384, by providing permission information and option information. In response, control component 150 returns the status of the request, and the requested associations for which the device is a member. This is indicated by block 386. FIG. 24 is a flow diagram illustrating the Set_Device_Associations method. This method can be invoked, as indicated by block 392, by providing permission information, option information, and a list of members and attributes defining the associations. In response, control component 150 modifies the device association object 156 contained on the storage media, as indicated by block 394. The device association object is modified to include the attributes provided by the requester, and to include a time stamp showing when the object attributes were last modified, etc. Control component 150 returns the status of the request, as indicated by block 396.

The permission information described above illustratively allows the file server 114 to gate access to storage by controlling which requesters 116–120 the file server 114 gives the credentials needed to obtain a response from a storage device 110–112. File server 114 also dictates to the storage devices 110–112 that they must only honor I/O requests which adhere to the installation security policy. The keys underlying the permissions security capability are illustratively communicated to the storage devices 110–112 by the Set_Object_Attributes method. If an appropriate level of security is set for a storage device 110–112, that storage device may be configured to check every I/O command for security compliance. However, as discussed above, some applications need not employ security. Further, if a particular server cluster has some devices located in another physical facility, it may be desirable to define a higher level of security for communication with the remotely located devices, but not for communication from local traffic. This allows the employment of security for remotely located requesters or servers, but avoids the performance loss which would accompany employing such security for local requesters or servers as well.

Further, each storage device 110–112 preferably includes a readable monotonically incrementing clock to be used for time stamping secure messages and objects. In one illustrative embodiment, the clocks for the various devices are synchronized on a system-wide basis. In another illustrative embodiment, file server 114 accommodates for discrepancies and values from storage device-to-storage device.

Thus, it can be seen that the present invention provides object oriented storage devices such as disk drives, which provide significant advantages over conventional storage devices. The object oriented storage devices significantly improve the cluster architecture. For example, by storing data in an object oriented fashion, the data can be managed by the storage device itself. Objects provide the storage device with sufficient knowledge of its resident data such that it can assume responsibility for managing its own space. Further, sharing of data can be controlled more intelligently when the device has information about what constitutes a logical entity. For example, if two systems were to share data stored on a block oriented device, all metadata activity would have to be controlled for concurrent access. By contrast, in an object oriented device, much of the metadata activity is opaque to the systems accessing it. Thus, the systems need only concern themselves with access conflicts to user data. Further, space management being performed by the device itself eliminates any contention or confusion which can arise from two systems trying to manage space on the same storage device at the same time.

In addition, heterogeneous computing is made much easier by an object abstraction. Object oriented storage devices provide the ability to at least have an organization which an operating system can interpret.

Further, the performance in a clustered system is enhanced by using object oriented storage devices for a number of reasons. For example, the metadata need never leave the device itself, eliminating a certain number of I/O operations.

In addition, the device knows which objects are open or closed at any one time, and is able to use this information to more effectively cache data. Pre-fetching can also be much more effective, since the device knows the layout of the object being read. The storage device can more effectively determine sequential access patterns. The cache in the device can also hold metadata once for multiple systems which are accessing it. Further, the device can participate in quality of service decisions, such as where to locate data more appropriately. The device can typically only do this if it has responsibility for allocating storage. By contrast, almost no operating systems can allocate data, by zone, on a disc drive. Thus, providing this capability on the drive itself enhances performance.

The present invention can also be implemented in disc drives arranged as an array of drives. Because the information stored on a disc drive array is often much more valuable than the disc drives themselves, drive arrays are often referred to as Redundant Arrays of Inexpensive Discs (RAID). Several types of RAID systems or RAID levels are known. For example, first level RAID is characterized by providing mirrored discs, as discussed above. In fifth level RAID, both the data to be stored to the array as well as the parity or redundant data, is spread over all disc drives in a group. The fifth level RAID distributes the data and check information across all the discs, including check discs. Other RAID levels (e.g., levels 2–4) are described in greater detail in U.S. Pat. No. 5,617,425 entitled DISC ARRAY HAVING ARRAY SUPPORTING CONTROLLERS AND INTERFACE.

FIGS. 25–29 illustrate a write operation performed in accordance with one aspect of the present invention, in which data is stored as objects on the disc drives in an array. In the embodiment illustrated in FIG. 25, file server 114, requester (or host) 116 and interconnect 122 are shown connected to a disc drive array which includes target drive 402 and parity drive 404 configured as storage devices, such as storage devices 110–112. Target drive 402 holds an object, or a portion thereof, which is to be written to, while parity drive 404 holds the parity information associated with the target object stored on target drive 402.

Figure 25:
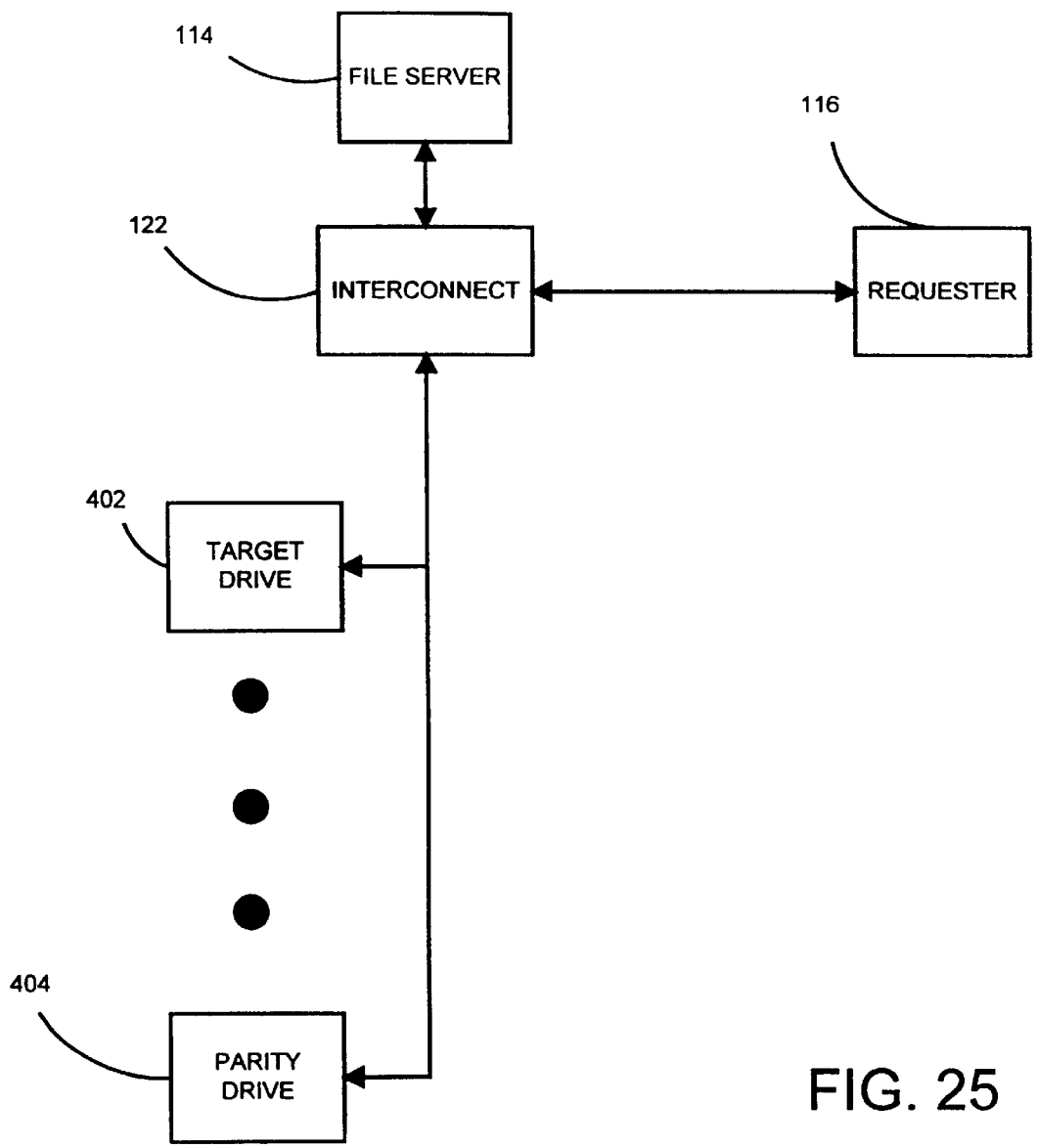
FIG. 25 is a block diagram illustrating a disc drive array implemented in accordance with one aspect of the present invention.

In FIG. 25, the drive array is implemented as a RAID 5 array in which data and parity is distributed across all drives in the group. Therefore, drive 402 is the target drive and drive 404 is a parity drive, only for the present write operation. In other words, target drive 402 also holds parity information and parity drive 404 also holds data. However, for the single write operation discussed below, drive 402 is the target drive and drive 404 is the corresponding parity drive. It should also be noted that the present invention can be implemented using other RAID levels, other than RAID level 5. The present invention in such RAID systems will be apparent to those skilled in the art.

In FIG. 25, target drive 402 and parity drive 404 are connected to one another through Fibre Channel interfaces, or other suitable interfaces, such as other serial interfaces.

Figure 26:
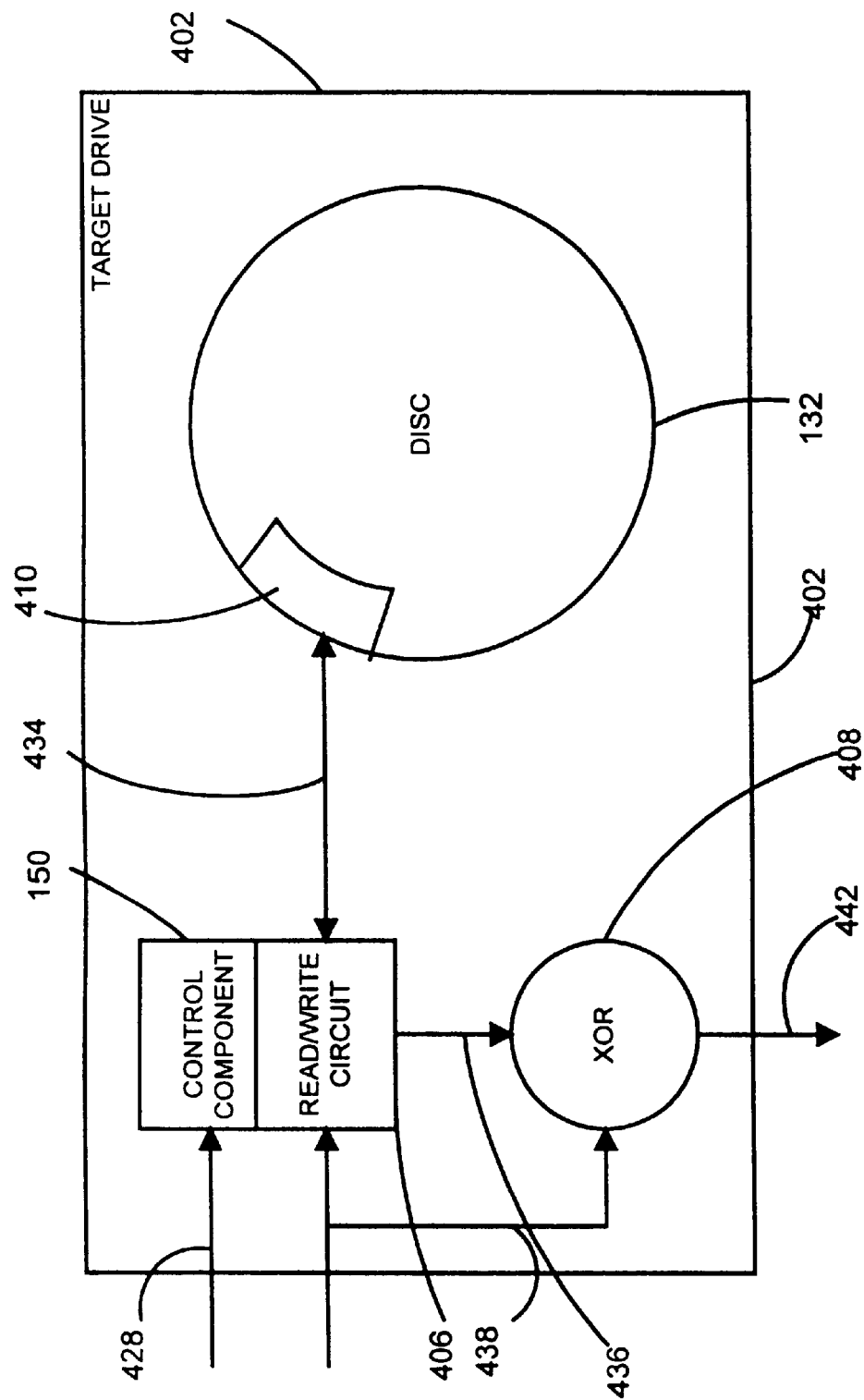
FIG. 26 is a block diagram illustrating a target disc drive in accordance with one aspect of the present invention.
Figure 27:
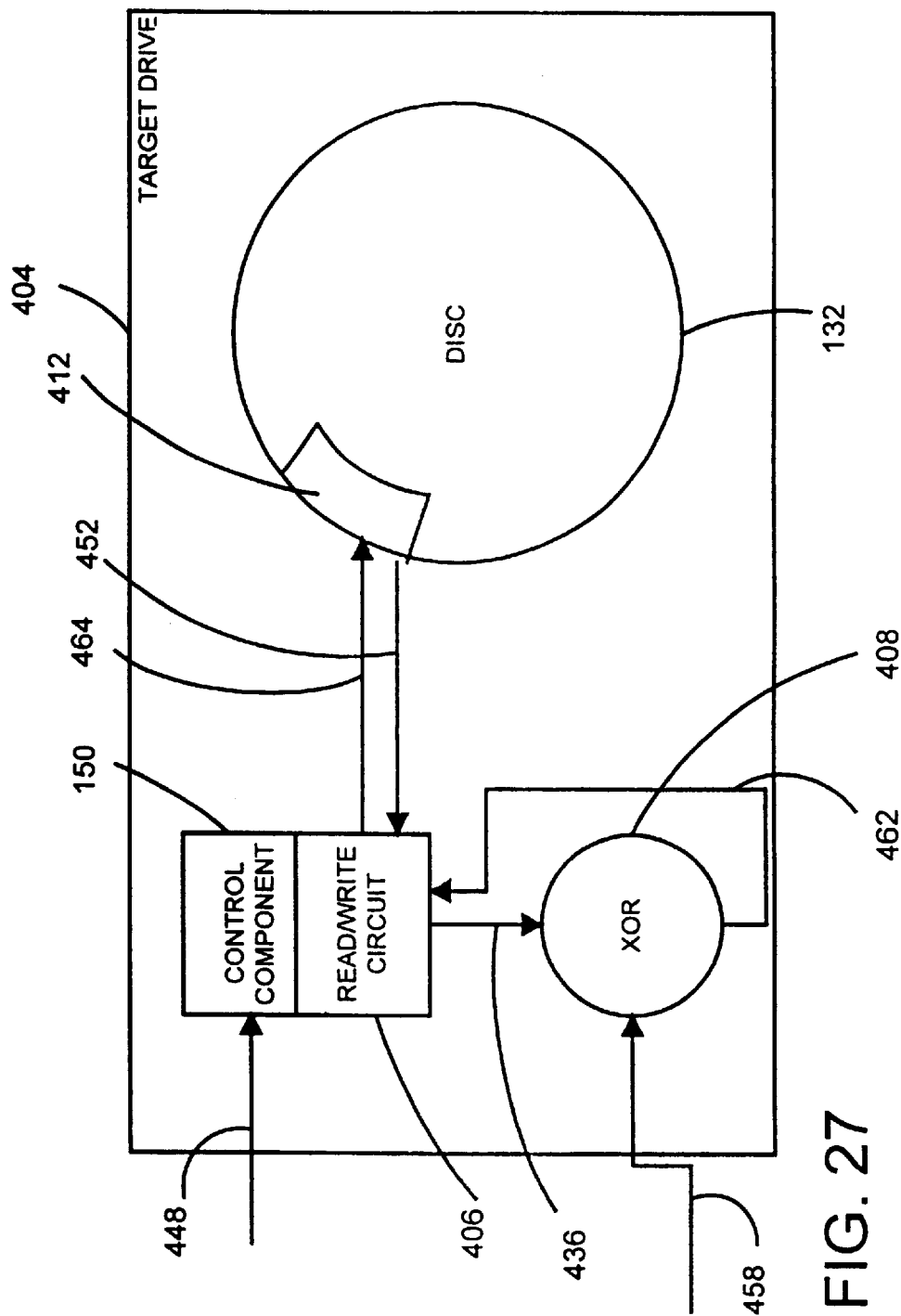
FIG. 27 is a block diagram illustrating a parity disc drive in accordance with one aspect of the present invention.

FIGS. 26 and 27 illustrate target drive 402 and parity drive 404, respectively. Each drive includes control component 150 and one or more discs 132. Each drive also includes read/write circuit 406 (such as a data head described above) and an Exclusive Or (XOR) circuit 408. Target drive 402 includes disc space 410 which stores the target object to be written. Parity drive 404 includes disc space 412 which stores a corresponding parity object. The operation of drives 402 and 404 is discussed in greater detail below with respect to FIGS. 28 and 29.

Conventional disc arrays implementing small computer system interfaces (SCSI) XOR commands enable disc drives to carry out the bit manipulations necessary to implement parity protection against drive failure. Such commands require the host (or requester) to have sector access to the disc so that for any sector written to one disc drive, the corresponding sector on another disc drive containing parity information can be updated appropriately. However, the object oriented disc drives discussed above introduce a layer of abstraction between the host and actual storage sectors on the disc drive. Specifically, the disc drives manage disc space as objects such that a host (or requester) does not have access to the underlying sector addressing scheme. The disc drive, itself, is responsible for space management making it impossible for a requester or host to correlate a portion of data written on one disc drive with a location on another.

Thus, the requester does not know the address on a disc drive of a block that it has written, and it cannot calculate a corresponding parity address. This makes it very difficult, if not impossible, to use conventional XOR functions in an object oriented disc drive, as described above.

Therefore, the present invention provides a method referred to as Define_Parity_Group which is invoked at each of the disc drives in a set of disc drives which make up a parity group. The method accomplishes two things. First, it provides sufficient information to enable an invocation of a standard Write_Object method to perform the same function as a sector based XOR command in a conventional drive array. It also causes an object to be created on each drive in the set which holds that particular drive's share of parity data. The parity object ID is a well-known ID, known to each drive, so that any drive wanting to update parity information is aware of the correct object identifier to which it can address its request.

Figure 28:
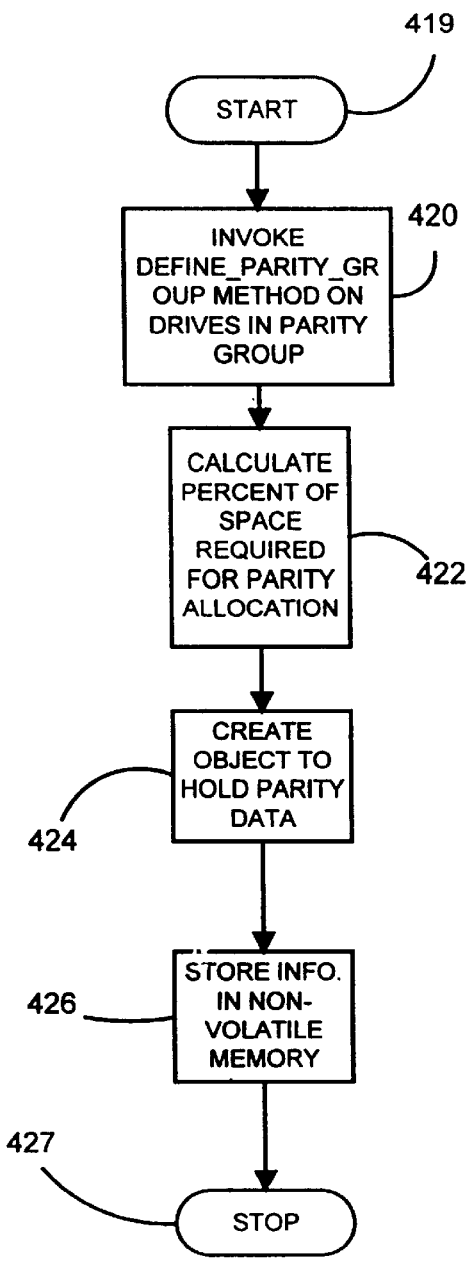
FIG. 28 is a flow diagram illustrating the creation of a parity group in accordance with one aspect of the present invention.

The Define_Parity_Group method is described in greater detail with respect to FIG. 28. First, a requester, or host, invokes the method at each drive in a parity group. This is indicated by block 420. In order to invoke the method, the requester provides a number of things as follows:

1. An ordered list of drives comprising the parity group. This can include, illustratively, serial numbers and addresses for each drive.
2. An algorithm used in calculating parity. In one simple illustrative implementation, modulus arithmetic is performed on the block address of data to be written. This arithmetic yields both the parity drive address (based on the ordered list from item number one above) and the relative block address in the parity object on the parity drive (which is the relative portion of the parity object containing the desired parity information).
3. The amount of data in a parity stripe, illustratively in units of blocks. If parity data is to be interspersed throughout the space on each drive, this information is the atomic unit of allocation.
4. The parity object identifier. A drive invoking a Write_Object method to update a parity object issues it to this object ID on the parity drive determined as set out in item two above. It should also be noted that multiple level parity (such as two level parity) can be implemented as well. Thus, each drive may have up to two parity objects. In one illustrative implementation, two well-known object IDs are allocated and reserved by each drive, in case the drive is used in a disc array having two-level parity. The presence of a second parity object indicates that two-level parity is being utilized.
5. The parity object allocation policy. This indicates whether each drive is to allocate the parity object as a single contiguous extent of disc space or to intersperse the parity object with user data objects. Thus, while the parity object and data object are shown in FIGS. 26 and 27 as contiguous disc space, this is illustrative only. It should be noted that if the parity object is interspersed with data, it can still be pre-allocated.

In response to invocation of the Define_Parity_group method, the control component 150 in each of the disc drives in the parity group calculates a percentage of its space required for parity data. This is indicated by block 422. The amount of space required for the parity object is determined based on the number of disc drives in the parity group list. For example, if there are nine disc drives in the list, each drive must allocate one ninth of its space for parity information. This amount of space is identified with the well known parity object ID provided by the requester or host upon invocation of the method. This is indicated by block 424.

Each drive in the parity set or group list retains the information defining the parity group so that every time the disc drive is powered up or reset, it can verify that the parity group has not been compromised. Thus, the information is stored in non-volatile memory, as indicated by block 426.

Figure 29:
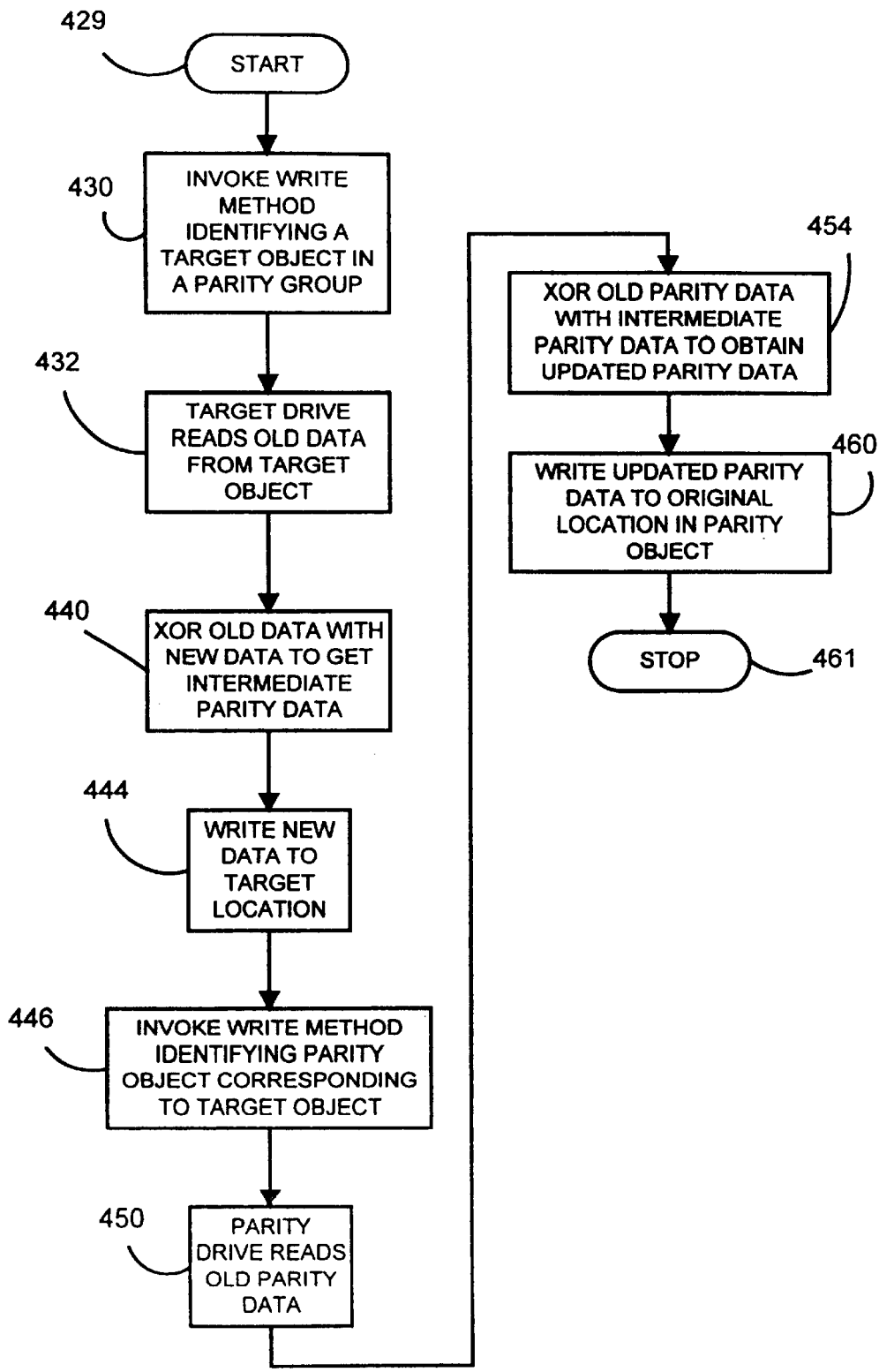
FIG. 29 is a flow diagram illustrating a write operation in which parity information is updated in accordance with one aspect of the present invention.

Having thus created a parity set of disc drives, and having allocated space on each disc drive to hold one or more parity objects, data stored in a data object on one or more drives can be updated. FIG. 29 is a block diagram illustrating the updating of a data object, and the corresponding updating of a parity object, in accordance with one aspect of the present invention.

In order to update data, the requestor 116 which is requesting data to be updated invokes the Write_Object method described above on one of the disc drives in the parity group. In the embodiment illustrated in FIGS. 25–27, requester 116 invokes the Write_Object method on target drive 402. This is indicated by arrow 428 in FIG. 26 and block 430 in FIG. 29. In order to invoke this method, requester 116 provides, illustratively, an object identifier identifying the object to be updated, a partition ID, a starting location of blocks to be written within the object, a number of blocks to be written within the object, option information, and the data to be written. Target drive 402 knows that servicing the Write_Object method must include updating parity information associated with the object being updated. Target drive 402 knows this because it has stored the information provided and generated during execution of the Define_Parity_Group method in non-volatile memory.

In order to update the parity information, target drive 402 performs a number of steps. First, it reads old data from the specified location in the target object and provides it, along with the new data to be written to that location, to XOR circuitry 408. This is indicated by block 432 in FIG. 29 and arrows 434, 436, and 438 in FIG. 26.

Next, target drive 402 XORs the old data with the new data to obtain intermediate parity information. This is indicated by block 440 in FIG. 29. Target drive 402 provides the intermediate parity information at an output 442 in FIG. 26. Next, target drive 402 writes the new data to the target location within the target object 410, thus updating the target object. This is indicated by block 444 in FIG. 29.

Target drive 402 then, itself, invokes another Write_Object method on parity drive 404 identifying the parity object corresponding to the target object 410 which was just updated. This is indicated by block 446 in FIG. 29 and arrow 448 in FIG. 27. Target drive 402 can calculate the target location for the parity object in a number of ways. For example, target drive 402 can calculate the location from the relative sector address of the block target object being written. The relative address is divided by the number of drives in the parity group to provide the relative address in the parity object on the parity drive 404. The parity drive address is determined by the algorithm specified in the Define_Parity_Group method. Target drive 402 then constructs the Write_Object method and invokes it on the parity drive 404 identifying parity object 412 and an appropriate location within that object using this relative address.

By way of example, in order to calculate the relative block in the parity object on drive 404 to be updated, target drive 402 can use the following Equation:

$$B=\text{INT}(S/D\text{-}1) \quad \text{Equation 1}$$

where B is the relative block in the parity object;
S is the relative sector address being written at target drive 402; and
D is the number of drives in the parity group.

In order to calculate the parity drive address, target drive 402 can use the following Equation:

$$P=\text{Mod}(S/D\text{-}1) \quad \text{Equation 2}$$

when P is the displacement into the list of drives in the parity group of the parity drive (the list used in calculating P must exclude the address of target drive 402).

In response to this Write_Object method, parity drive 404 recognizes the command as a write to its parity object and performs the parity operations. Such operations include reading the old parity data, as indicated by block 450 in FIG. 29 and arrow 452 in FIG. 27. Parity drive 404 then XORs the old parity information with the intermediate parity data from target drive 402. This is indicated by block 454 in FIG. 29 and by arrows 456 and 458 in FIG. 27. The result of the Exclusive OR operation is updated parity information which is written to the parity object of disc 132. This is indicated by block 460 in FIG. 29 and by arrows 462 and 464 in FIG. 27. This completes the update of the parity object.

Figure 30:
FIG. 30 illustrates a data structure in accordance with one aspect of the present invention.

FIG. 30 is a more detailed illustration of one data object 500 (such as those shown in FIG. 6). In accordance with one aspect of the present invention, data object 500 includes a number of portions, including a portion 502 containing attributes, and a number of data portions 504, 506, and 508, each with an associated error correction code portion 510, 512 and 514, respectively. While the error correction code portions 510, 512 and 514 are shown adjacent the corresponding data portions, they need not be recorded this way on the disc, but are shown this way for expedience. Thus, in accordance with one preferred embodiment, each of the data portions (and indeed possibly the attributes portion) of object 500 is used to generate error correction code (ECC) information in a known manner. This information can be used, when reading back the corresponding user data, to determine whether the user data contains any errors, and (depending on the code used) to locate and correct those errors. In one preferred embodiment, the ECC information is generated using a Reed Solomon code. However, any suitable code can be used to generate the ECC information.

In prior disc drives, if a sector is rendered unreadable, and is used for a special purpose by the operating system, this can render substantially the entire disc unreadable. For example, if the master boot record, the partition boot record, the FAT table, or the root directory become unreadable, this can cause a loss of essentially the entire disc contents. Conventional operating systems do not have the ability to recover the readable data in the face of losing such key file system management data. Therefore, in accordance with one aspect of the present invention, the object oriented data organization on the disc drive makes the disc drive responsible for maintaining basic file system structures that were formerly the domain of the operating system. In accordance with one aspect of the present invention, a redundant copy of the essential file system data is stored with each data block, or data portion, in its associated ECC portion. Since the ECC portions will already be stored on the disc, embedding the file system information in the ECC portion of the data object does not impact performance or user capacity in any way.

Figure 31:
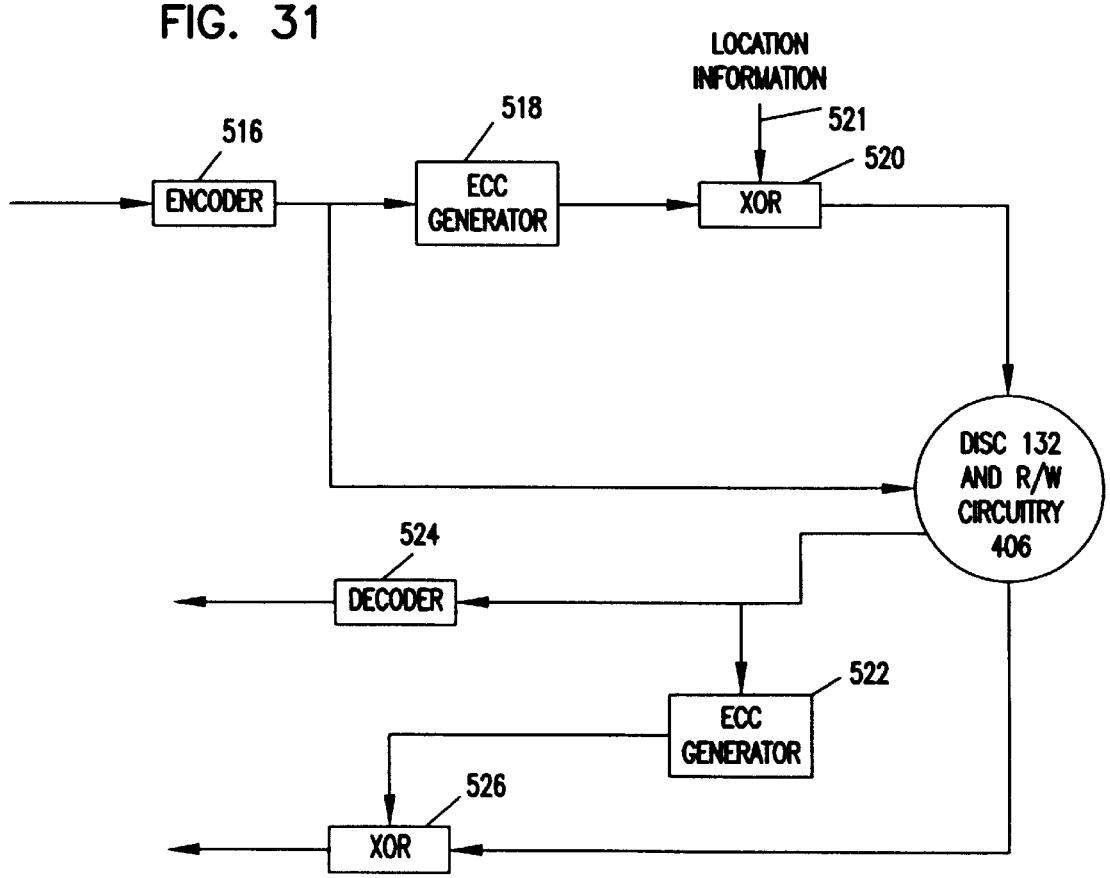
FIG. 31 is a block diagram of a disc drive utilizing embedded location information in accordance with one aspect of the present invention.
Figure 32:
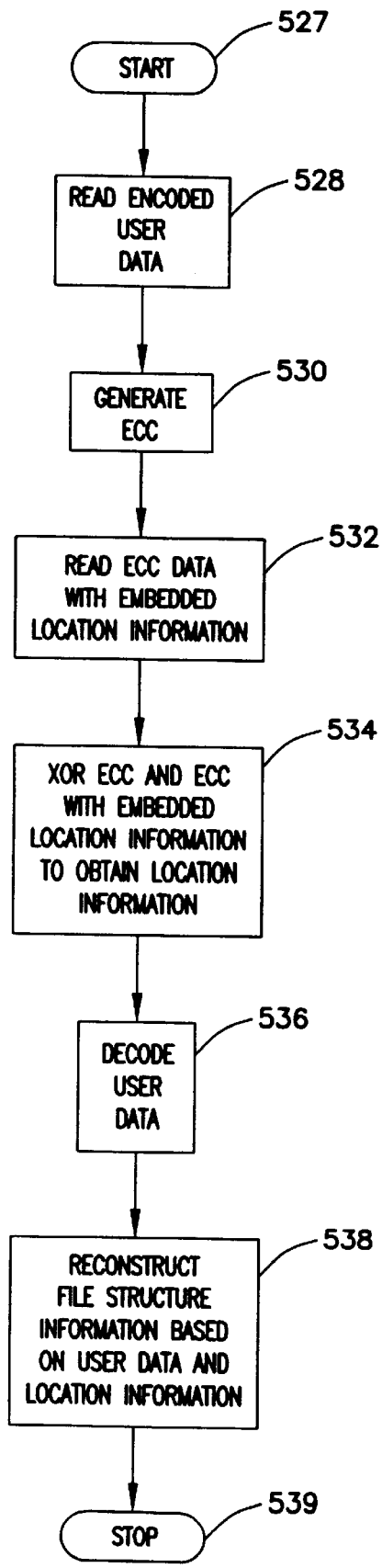
FIG. 32 is a flow diagram illustrating the operation of the system shown in FIG. 31.

FIG. 31 is a block diagram illustrating how file system information is combined with, or embedded in, ECC information prior to recording the information on the disc. FIGS. 31 and 32 also illustrate how the file system information is then used to reconstruct the file system data in accordance with one aspect of the present invention. FIG. 31 shows encoder 516, ECC generator 518, Exclusive OR circuit 520, disc 132 and read/write circuitry 406, ECC generator 522, decoder 524 and Exclusive OR circuit 526. It should be noted that encoder 516, ECC generator 518, Exclusive OR circuit 520, decoder 524, ECC generator 522 and Exclusive OR circuit 526 can all be implemented within control component 150 on the disc drive, or can be implemented separately.

User data is first provided to encoder 516 from a host, a requester or a file server. Encoder 516 encodes the data according to a predetermined coding algorithm, typically implemented to decrease error rate. The encoded user data is then provided to ECC generator 518. ECC generator 518 generates ECC information based on the encoded user data, in a known manner. The ECC information generated will depend on the particular type of error correction coding scheme used. The ECC information is, in turn, provided to Exclusive OR circuit 520. The file system data is also provided to Exclusive OR circuit 520 at input 521. In the embodiment illustrated in FIG. 31, the file system data is location information which identifies a location at which the user data is written on disc 132. For example, in the object oriented system described above, the location information includes the object identifier which identifies the object to which the user data belongs. The location information also includes relative position information which identifies the relative position of the associated data portion within the identified object. The output of Exclusive OR circuit 520 thus provides the ECC information with the located information embedded (or seeded) therein. This information is provided to read/write circuitry 406 and is written to disc 132, as the associated ECC portion for the data portion containing the encoded user data provided by encoder 516.

When reading the information back from disc 132 (in order to accomplish a normal read operation) the control component 150 executes the Read_Object function by providing the expected location information to an Exclusive OR circuit and Exclusive ORing that information with the ECC information (which contains the embedded location information). The output of the Exclusive OR circuit yields the ECC information associated with the user data being read. This information is provided to an ECC generator, which determines whether any errors have occurred in the encoded user data. If not, the encoded user data is provided to a decoder where the error free information is presented to the requester or user. If errors have occurred, control component 150 may attempt to identify and correct the errors, depending upon the particular error coding scheme used. Alternatively, control component 150 may simply provide an error flag indicating that the data contains one or more uncorrectable errors.

However, where the system information (in the example illustrated-the location information) has been lost, control component 150 operates in a different manner. Control component 150 causes the data on disc 132 to be read. This is indicated by block 528 in FIG. 32. The encoded user data is provided to decoder 524 and to ECC generator 522. It should be noted that ECC generator 522 and ECC generator 518 can be the same generator, with appropriate multiplexing circuitry. However, for the sake of clarity, they are illustrated in FIG. 1 as separate components.

ECC generator 522 generates ECC information based upon the encoded user data as indicated by block 530 in FIG. 32. This information is provided to Exclusive OR circuit 526. The ECC information (which contains the embedded location information) is also read from disc 132 and provided to Exclusive OR circuit 526. This is indicated by block 532. As with ECC generator 522, Exclusive OR circuit 526 can the same as Exclusive OR circuit 520, with appropriate multiplexing circuity. However, for the sake of clarity, the two circuits are shown separately.

By Exclusive ORing the ECC information provided by ECC generator 522 with the ECC information containing the embedded location information, the ECC information in both inputs to Exclusive OR circuit 526 will cancel each other out, resulting in an output of simply the location information. This is indicated by block 534. This information can be used in conjunction with the user data output by decoder 524 to reconstruct the file system information which has been lost. This is indicated by blocks 536 and 538. For example, the object directory can now be reconstructed using the location information retrieved from the disc, and associated with the user data also read from the disc.

In accordance with another aspect of the present invention, the ECC information generated by ECC generator 518 can be randomized by utilizing a pseudorandom (or pseudonoise) generator. FIG. 33 is a block diagram illustrating such an embodiment. A number of the items shown in FIG. 33 are similar to those shown in FIG. 31, and are similarly numbered. The block diagram illustrated in FIG. 33 operates substantially the same as that shown in FIG. 31. However, rather than providing simply the location information at input 521 to Exclusive OR circuit 520, the location information is used to seed a random number generated by pseudonoise (PN) generator 540. Thus, the location information is provided at an input 542 to PN generator 540. Based upon the seed value, PN generator 540 generates an output provided to XOR circuit 521, which is Exclusive ORed with the ECC information provided by ECC generator 518, which is recorded on disc 132 along with the associated encoded user data.

In order to reconstruct the file system information (e.g., the location information) the encoded user data is read from disc 132 and provided to ECC generator 522 which generates ECC information and provides it to Exclusive OR circuit 526. The ECC information containing the embedded pseudorandom value is also read from disc 132 and provided to Exclusive OR circuit 526. The output of Exclusive OR circuit 526 yields the random value which has been seeded with the location information. This is provided to inverse PN generator 544 which reverses the randomization process provided by PN generator 540, and provides, at its output 546, the location information seed value. As with the embodiment shown in FIG. 31, this information can be used along with the decoded user data provided by decoder 524, to reconstruct the file system structure information which was previously lost.

The XOR gates 520 and 526 described herein are illustratively byte-wide XOR circuits for the individual bits within the data bytes XORed. Thus, the XOR circuit is really eight individual XOR gates to provide an eight-bit byte XOR function. Further, although the invention as described herein refers to XOR gates, any suitable Galois field manipulation (or addition), or other suitable manipulation, over the field that the error correction and detection codes are based is considered to be within the scope of the invention, and could be implemented by one skilled in the art.

Also, in one preferred embodiment, PN generator 540 is described in greater detail in U.S. Pat. No. 5,717,535 to French et al., issued Feb. 10, 1998. That patent describes the generator as having 33 register cells, with inputs and outputs connected to a logic block. The register cells are one bit wide and are clocked on the same clock as the data bytes. The generator is sufficient to hold an object identifier and relative location information of up to four bytes (32 bits) long, but can easily be expanded to accommodate larger location information or other file system information, larger than four bytes. The generator also illustratively contains an extra register cell which is used so that location information having a value of zero will not produce all zeros at the output of PN generator 540. There is no reason that this extra cell must be included in PN generator 540 if used solely for the purpose of seeding the file system information with ECC information. However, if generator 540 is used to randomize data for some other reason (i.e., error tolerance) the extra cell should be included so that an all zero input will provide a non-zero output. Data is clocked illustratively by a clock at a rate once every eight data bits (i.e., once every byte).

In the illustrative embodiment, generator 540 comprises a plurality of flip flops which operate in accordance with Equations 3 and 4 below, where B represents the input to a flip flop and A represents the output from a flip flop.

$$B_I = A_{I+8};$$ Equation 3 for I=0 to 24; and $$B_I = A_m \text{XOR } A_{M+13};$$ Equation 4 for I=25–32, M=(I+8) Modulo 33.

It should be noted that generator 540 is illustratively equivalent to a binary feedback shift register based on the primitive polynomial $X^{33}+X^{13}+1$, and shifted eight times per clock. The logic block driving the inputs to the register cells represents the result of these eight shifts. From this analogy, it is clear that the sequence of bytes provided at the output of generator 540 illustrative repeats every $2^{33}-1$ bytes.

Thus, it can be seen that the present invention provides significant advantages over prior systems. The present invention allows user data to be read even in the face of a loss of critical file system information, such as file system structure data. The present invention embeds the file system information (such as file system structure information) in the ECC information corresponding to data portions of an object. The file system information can then be read simply by reading the data on the disc and reversing the embedding process, and the file system information can thus be reconstructed.

In accordance with one aspect of the present invention, the invention includes a data structure on a disc 132 in a disc drive, the data structure including an object 500 having a plurality of portions which comprise a data portion 504 and an object location portion 510 containing object location information associated with the object 500. The object location portion 510, in one illustrative embodiment, includes error correction code (ECC) information seeded with the object location information. The object location information illustratively includes object identification information.

In one embodiment, the data portion includes a plurality of data sections 504, 506 and 508, wherein the ECC portion includes an ECC field 510, 512 and 514 associated with each data section. Each ECC field includes the FCC information generated based on the data in the associated data section. The ECC field further includes the object identification information identifying an object 500 to which the data section belongs and relative position information indicative of a relative position of the data section within the object 500 identified by the object identification information.

The present invention can also be implemented in a disc drive having a disc 132 with data stored thereon. The data is illustratively stored as objects 124–126 including data portions 504, 506 and 508 and associated error correction portions 510, 512 and 514. The error correction portions include object location information indicative of a location on the disc drive at which the object 500 is stored. The disc drive includes a data head 142 mounted relative to the disc 132 to access data on the disc 132. A control component 150 is operatively coupled to the head 142 and provides an interface 128 to the objects 124–126 through exposed functions or methods (method 0–method N) which are invoked to access the objects 124–126.

In one illustrative embodiment, control component 150 is configured to maintain file system structure information (such as DCO 154, DAO 156, PCO 164 and POL 166) objects on the disc drive in addition to the object location information stored in the error correction portions. File system structure information may include an object directory indicative of an identity of each of the objects 124–126 and a location at which each of the portions of the objects is located on the disc drive. The object location information illustratively includes an object identifier indicative of an object to which the associated data portions belong and a data portion location indicative of a relative position of the associated data portion within the object identified by the object identifier.

In accordance with one aspect of the present invention, control component 150 is configured to reconstruct lost file system structure information based on the object location information stored in the ECC portions 510, 512 and 514 in the objects 500.

In accordance with another aspect of the present invention, a method is used for storing information on a disc 132 on a disc drive. The method includes storing information on the disc 132 as a plurality of objects 124–126, wherein each object has a plurality of data portions 504–508 and associated location portions 510–514. The data location portions include location information indicative of a location of the associated data portion. The method includes maintaining, on the disc drive, file system structure information in addition to the location portions, the file system structure information being indicative of an identity of the objects 124–126 and a location of the objects 124–126 on the disc drive.

In accordance with another aspect of the present invention, the method also includes reconstructing lost file system structure information based on the location information stored in the location portions 510–514. Further, the storing step illustratively includes storing error correction code information in the location portions 510–514 and seeding the ECC information with the location information.

The reconstructing step illustratively includes reading the seeded ECC information, deriving the object identifier and relative location identifier from the ECC information, and reconstructing the file system structure information based on the object identifier and relative location identifier derived.

In accordance with another aspect of the present invention, the file system structure information comprises an object directory including object identifiers and a set of relative location identifiers for a plurality of objects wherein the reading step, the deriving step and reconstructing step are performed for a plurality of objects.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular interface methods, redundancy scheme or error detection or correction scheme used while maintaining substantially the same functionality without departing from the scope and spirit of the present invention.

What is claimed is:

1. A data structure on a disc in a disc drive, the data structure including an object accessible by exposed methods and having a plurality of portions, the portions comprising:
   a data portion containing data; and
   an object location portion containing object location information associated with the object.

2. The data structure of claim 1 wherein the object location portion comprises an error correction code (ECC) portion including ECC information seeded with the object location information.

3. The data structure of claim 2 wherein the object location information comprises object identification information.

4. The data structure of claim 3 wherein the data portion includes a plurality of data sections and wherein the ECC portion includes:
   an ECC field associated with each data section, each ECC field including the ECC information generated based on the data in the associated data section, the ECC field further including the object identification information identifying an object to which the data section belongs and relative position information indicative of a relative position of the data section within the object identified by the object identification information.

5. A disc drive, comprising:
   a disc having data stored thereon, the data being stored as objects including data portions and associated error correction portions, the error correction portions including object location information indicative of a location on the disc drive at which the object is stored;
   a head mounted relative to the disc to access data on the disc; and
   a control component operably coupled to the head, the control component providing an interface to the objects through exposed functions which are invoked to access the objects.

6. The disc drive of claim 5 wherein the control component is configured to maintain file system structure information on the disc drive in addition to the object location information stored in the error correction portions.

7. The disc drive of claim 6 wherein the file system structure information comprises:
   an object directory indicative of an identity of each of the objects; and
   a location at which each of the portions of the objects is located on the disc drive.

8. The disc drive of claim 7 wherein the error correction portions include error correction code (ECC) information for use in correcting an associated data portion, the ECC information being seeded with the object location information.

9. The disc drive of claim 7 wherein the object location information includes:
   an object identifier indicative of an object to which the associated data portion belongs; and
   a data portion location indicative of a relative position of the associated data portion within the object identified by the object identifier.

10. The disc drive of claim 9 wherein the control component is configured to reconstruct lost file system structure information based on the object location information stored in the ECC portions of the objects.

11. The disc drive of claim 10 wherein the control component is configured to reconstruct the lost file system structure information by reading the ECC portions, obtaining the object location information stored therein, and reconstructing the lost file system structure information based on the location information obtained.

12. A method of storing information on a disc in a disc drive, the method comprising steps of:
   (a) storing information on the disc in a plurality of objects, each object having a plurality of data portions and an associated location portion, each data portion including data indicative of the information and each associated location portion including location information indicative of a location of the associated data portion;
   (b) maintaining, on the disc drive, file system structure information in addition to the location portions, the file system structure information being indicative of an identity of the objects and a location of the objects on the disc drive; and
   (c) reconstructing lost file system structure information based on the location information stored in the location portions.

13. The method of claim 12 wherein the storing step (a) comprises a step of:
   (a)(1) storing error correction code (ECC) information in the location portion.

14. The method of claim 13 wherein the storing step (a) further comprises a step of:
   (a)(2) seeding the ECC information with the location information.

15. The method of claim 14 wherein the seeding step comprises a step of:
   seeding the ECC information with an object identifier and a relative location identifier, the object identifier including information indicative of an identity of an object containing the data portion associated with the information portion and the relative location identifier including information indicative of a relative location of the data portion within the object identified by the object identifier.

16. The method of claim 15 wherein the reconstructing step (c) comprises steps of:
   (c)(1) reading the seeded ECC information;
   (c)(2) deriving the object identifier and relative location identifier from the ECC information; and
   (c)(3) reconstructing the file system structure information based on the object identifier and relative location identifier derived.

17. The method of claim 16 wherein the reading step (c)(1), the deriving step (c)(2) and the reconstructing step (c)(3) are performed by a control component on the disc drive.

18. The method of claim 16 wherein the file system structure information comprises an object directory including object identifiers and a set of relative location identifiers for a plurality of objects and wherein the reading step (c)(1), the deriving step (c)(2) and the reconstructing step (c)(3) are performed for a plurality of objects.

* * * * *